US008134624B2

(12) United States Patent
Solhusvik et al.

(10) Patent No.: US 8,134,624 B2
(45) Date of Patent: Mar. 13, 2012

(54) METHOD AND APPARATUS PROVIDING MULTIPLE EXPOSURE HIGH DYNAMIC RANGE SENSOR

(75) Inventors: Johannes Solhusvik, Haslum (NO); Robert Johansson, Oslo (NO)

(73) Assignee: Aptina Imaging Corporation, George Town (KY)

( * ) Notice: Subject to any disclaimer, the term of this patent is extended or adjusted under 35 U.S.C. 154(b) by 857 days.

(21) Appl. No.: 12/216,433

(22) Filed: Jul. 3, 2008

(65) Prior Publication Data

US 2010/0002094 A1    Jan. 7, 2010

(51) Int. Cl.
H04N 3/14 (2006.01)
H04N 5/335 (2011.01)
H01L 27/00 (2006.01)
H01L 31/062 (2012.01)
H01L 31/113 (2006.01)

(52) U.S. Cl. ............ 348/308; 348/302; 250/208.1; 257/290

(58) Field of Classification Search .......... 348/262, 348/294–297, 302, 308
See application file for complete search history.

(56) References Cited

U.S. PATENT DOCUMENTS

| 6,115,065 | A  |   | 9/2000  | Yadid-Pecht et al. |            |
|-----------|----|---|---------|--------------------|------------|
| 6,909,461 | B1 |   | 6/2005  | Gallagher et al.   |            |
| 6,977,685 | B1 | * | 12/2005 | Acosta-Serafini et al. | ... 348/308 |
| 7,009,636 | B2 |   | 3/2006  | Liu et al.         |            |
| 7,038,185 | B1 |   | 5/2006  | Tumblin et al.     |            |
| 7,142,723 | B2 |   | 11/2006 | Kang et al.        |            |
| 7,190,398 | B1 |   | 3/2007  | Yadid-Pecht et al. |            |
| 7,411,168 | B2 | * | 8/2008  | Johnson et al.     | ... 250/208.1 |
| 7,791,657 | B2 | * | 9/2010  | Joshi et al.       | ... 348/262 |
| 2006/0133688 | A1 | | 6/2006  | Kang et al.        |            |
| 2007/0002164 | A1 | | 1/2007  | Ward et al.        |            |

OTHER PUBLICATIONS

Varkonyi-Koczy, A. et al., "High Dynamic Range Image Based on Multiple Exposure Time Synthetization", Acta Polytechnica Hungarica, vol. 4, No. 1, 2007.
"HDR Photography Explained, Definition, Realization", WithinLights, Jul. 2, 2008.
Kitchen, A. et al., "A Digital Pixel Sensor Array with Programmable Dynamic Range", IEEE Transactions on Electron Devices, vol. 52, No. 12, pp. 2502-2601, Dec. 2005.

* cited by examiner

Primary Examiner — Kelly L Jerabek

(57) ABSTRACT

Imagers reproduce an image by converting photons to a signal that is representative of the image. A sensor readout module reads reset and signal voltages corresponding to a plurality of integration times for each of a plurality of pixels. The sensor readout module is capable of determining whether the differences between reset and signal voltages corresponding to respective integration times indicate a saturation condition of the pixel. Accordingly, the sensor readout module may provide an output signal based on reset and signal voltages corresponding to an integration time that is less than an integration time for reset and signal voltages that indicate the saturation condition. A normalization module may normalize the output signal to correspond with a linear response curve.

36 Claims, 16 Drawing Sheets

METHOD AND APPARATUS PROVIDING MULTIPLE EXPOSURE HIGH DYNAMIC RANGE SENSOR

TECHNICAL FIELD

Embodiments described herein relate generally to imaging and more particularly to image sensor readout techniques.

BACKGROUND

Imagers reproduce an image by converting photons to signals that are representative of a scene being imaged. In an imager, photosensors capture the photons and provide respective signals that represent a captured image. Each photosensor may include a photodiode, which is initially reset to a reference voltage, and which, after reset, integrates a charge over a specified time period proportional to the intensity of light on the photosensor. However, a relatively high light intensity may cause the photosensor to saturate, such that the accumulated charge is equal to the maximum amount of charge which can be held by the photosensor. Saturation therefore results in inaccurate reproduction of the image. Saturation can be mitigated by decreasing the integration time at the expense of image loss in darker areas of an image.

Attempts have been made to provide readout techniques that compensate for photosensor saturation while trying to preserve detail in darker areas of an image. However, conventional techniques often compromise other performance characteristics, such as frame rate, power consumption, etc., or may require more components, resulting in greater power consumption, and/or a consumption of greater die area, resulting in higher cost.

Moreover, conventional techniques may accurately represent the bright areas of an image while sacrificing contrast in the dark areas, or accurately represent the dark areas of the image while clipping the bright areas. However, conventional techniques often are not capable of accurately representing the bright and dark areas at the same time.

Thus, a method and apparatus are needed that enable an image sensor to obtain a relatively high dynamic range, as compared to a conventional image sensor, without compromising other performance characteristics, such as slower frame rate, greater power consumption, greater number of components, and/or higher cost, etc.

BRIEF DESCRIPTION OF THE DRAWINGS

In the drawings, like reference numbers indicate identical or functionally similar elements. Additionally, the leftmost digit(s) of a reference number identifies the drawing in which the reference number first appears.

DETAILED DESCRIPTION

Embodiments described herein obtain a higher dynamic range for a captured image while mitigating some of the difficulties associated with other techniques for increasing dynamic range. The embodiments described herein read pixel reset and signal voltages corresponding to a plurality of integration times (i.e., exposure periods) for each pixel contained in an image pixel array. For instance, first reset and signal voltages of a pixel correspond to a first integration time, second reset and signal voltages of the pixel correspond to a second integration time that is different from the first integration time, and so on. The embodiments are capable of determining whether the differences between reset and signal voltages corresponding to the respective integration times indicate a saturation condition of a pixel. Accordingly, the embodiments output a pixel signal that corresponds to an integration time that is less than an integration time that would lead to the saturation condition.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is within the knowledge of one skilled in the art to effect such feature, structure, or characteristic in connection with other embodiments whether or not explicitly described.

Figure 1:
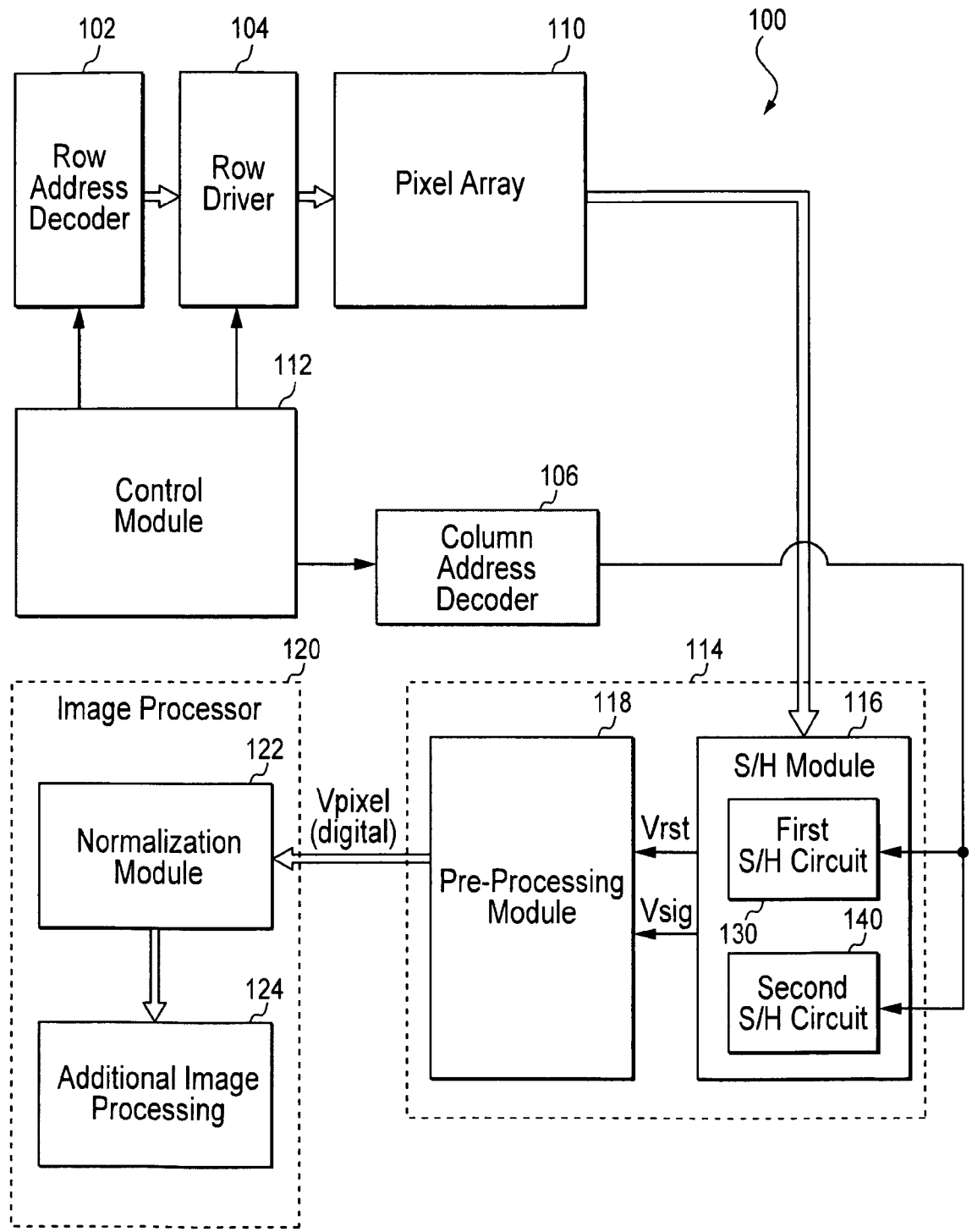
FIG. 1 is an example implementation of an imager in accordance with an embodiment disclosed herein.

FIG. 1 is an example implementation of an imager. In FIG. 1, imager 100 is a complementary metal oxide semiconductor (CMOS) imager, which includes a pixel array 110 having a plurality of pixels arranged in a predetermined number of columns and rows. The pixels in a given row of pixel array 110 are turned on at the same time by a row select line, and the pixel signals of each column are selectively provided to output lines by column select lines. A plurality of row and column select lines is provided for the entire pixel array 110.

Row driver 104 selectively activates control signal row lines in response to row address decoder 102 to provide row control signals used for signal capture and output of signals from pixels in a row. Control module 112 controls row address decoder 102 and column address decoder 106 for selecting the appropriate row and column select lines for pixel readout. For instance, a row and column address is provided for each pixel in pixel array 110. Row address decoder provides a row address for the row of pixels that is to be sampled by sensor readout module 114. Column address decoder 106 provides a column address to sensor readout module 114, indicating which of the pixels in the sampled row is to have its signals read out. Control module 112 further controls row driver 104, which applies a driving voltage to the respective drive transistors of the pixels in selected row select lines. Control module 112 causes each pixel in array 110 to undergo more than one integration time during an image capture operation.

A sensor readout module 114 includes a sample-and-hold (S/H) module 116 associated with a pre-processing module 118. S/H module 116 includes a first S/H circuit 130 and a second S/H circuit 140, each of which samples and holds pixel reset and signal voltages ($V_{rst}$ and $V_{sig}$) corresponding to a respective integration time for each pixel. A greater integration time corresponds to a greater difference between the respective reset and signal voltages, that is, a higher level of pixel output signal representing light intensities. A lesser integration time corresponds to a lesser difference between the respective reset and signal voltages, that is, a lower level of pixel output signal representing light intensities. A greater difference between the reset and signal voltages is desirable, so long as the difference does not correspond to a saturation condition of the pixel. For instance, if the difference is too great, then the photosensor of the pixel can saturate, leading to inaccurate reproduction of the image.

It should be noted that $V_{sig}$ depends on the integration time, but $V_{rst}$ does not. With a rolling shutter readout a row is reset and another row is read out. To read out one row of pixels, the floating diffusions in the pixels of the addressed row are reset by connecting them to a power supply and then letting them float. These reset values are read out via source followers in the pixels and are sampled in S/H circuit 130 or 140. The transfer gates in the addressed row are then asserted for a short time. This causes the charges collected in the photodiodes during the integration time to be transferred to the floating diffusions, causing the same to be lowered from the reset value. The signal values of the pixels in the addressed row are read out via the source followers of the pixels and sampled in S/H circuit 130 or 140. The differences $V_{rst}$–$V_{sig}$ are proportional to the integrated light for a given integration time.

First S/H circuit 130 selects among pixel reset and signal voltages corresponding to different integration times for each pixel and holds the selected pixel reset and signal voltages. The selected pixel and reset voltages are those having the greatest difference which also do not correspond to the saturation condition. Second S/H circuit 140 samples and holds pixel reset and signal voltages corresponding to yet another integration time for each pixel, which may be longer than the other integration times.

Pre-processing module 118 analyzes the reset and signal voltages corresponding to the different integration times for each pixel, produces digital values representing the digital pixel signal values, and selects an output digital pixel signal $V_{pixel}$ for each pixel having the greatest difference between $V_{rst}$ and $V_{sig}$ which also does not correspond to the saturation condition. Thus, pre-processing module 118 analyzes the analog pixel signal voltages on a pixel-by-pixel basis and selects for output a digital pixel signal for an integration period having the longest non-saturated pixel signal. Pre-processing module 118 provides a digitized output signal based on the selected integration period.

The digitized output pixel signal $V_{pixel}$ is then passed to an image processor 120 which has a first processing module 122 that normalizes the digitized pixel signals $V_{pixel}$ to a linear response curve. For instance, normalization module 122 may multiply digitized pixel signals $V_{pixel}$ associated with different integration times and amplification factors, as described below, by different multiplication factors to achieve the linear response curve. The operation of normalization module 122 is described in greater detail below with respect to FIG. 13.

Image processor 120 includes additional image processing circuits 124, which manipulate the digitized pixel signals to achieve color reproduction of an image represented by the plurality of pixels in pixel array 110. Image processor 120 may be on the same chip as imager 100, on a different chip than imager 100, or on a different stand-alone processor that receives a signal from imager 100. Normalization module 122 may be included in image processor 120, as shown in FIG. 1, or may be separate from image processor 120.

Figure 2:
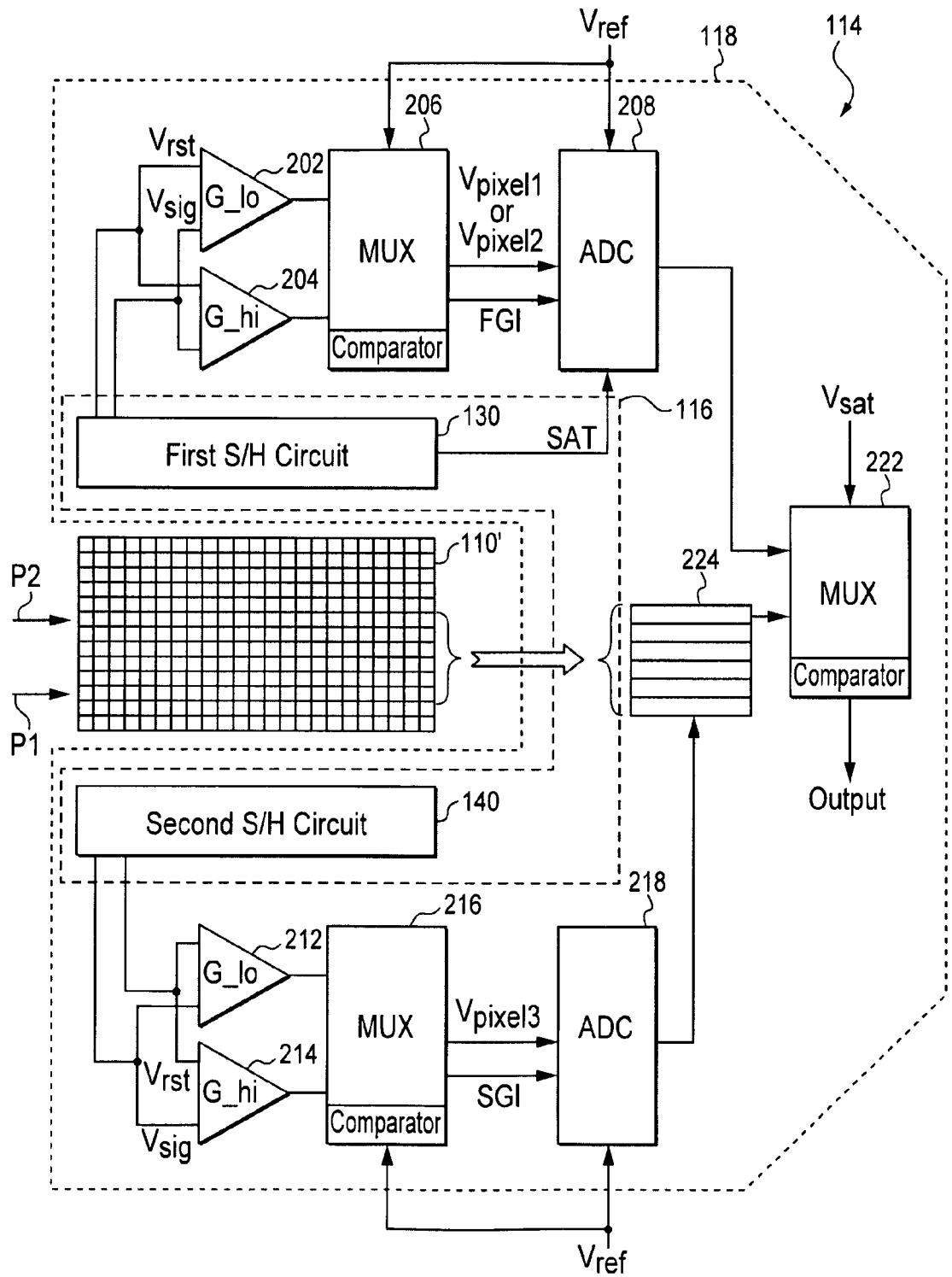
FIG. 2 is an example implementation of a sensor readout module in accordance with an embodiment disclosed herein.

FIG. 2 is an example implementation of the sensor readout module 114 of FIG. 1 in accordance with an embodiment disclosed herein. In FIG. 2, sensor readout module 114 includes a first sample-and-hold (S/H) circuit 130, a second sample-and-hold (S/H) circuit 140, and pre-processing module 118. First S/H circuit 130 receives first reset and signal voltages ($V_{rst1}$ and $V_{sig1}$) from a pixel corresponding to a first integration time and second reset and signal voltages ($V_{rst2}$ and $V_{sig2}$) from the pixel corresponding to a second integration time that is less than the first integration time. First S/H circuit 130 is configured to determine whether a difference between the first reset and signal voltages ($V_{rst1}$ and $V_{sig1}$) corresponds to a saturation condition of the pixel. If the difference between the first reset and signal voltages ($V_{rst1}$ and $V_{sig1}$) corresponds to the saturation condition, then first S/H circuit 130 overwrites the first reset and signal voltages ($V_{rst1}$ and $V_{sig1}$) with the second reset and signal voltages ($V_{rst2}$ and $V_{sig2}$) and provides the second reset and signal voltages ($V_{rst2}$ and $V_{sig2}$) as intermediate reset and signal voltages to pre-processing module 118. First S/H circuit 130 further provides a saturation indicator SAT representing a logical "1" to pre-processing module 118, indicating that the difference between the first reset and signal voltages is indicative of the saturation condition. On the other hand, if the difference between the first reset and signal voltages ($V_{rst1}$ and $V_{sig1}$) does not correspond to the saturation condition, then first S/H circuit 130 provides the first reset and signal voltages ($V_{rst1}$ and $V_{sig1}$) as the intermediate reset and signal voltages to pre-processing module 118. First S/H circuit 130 further provides the saturation indicator SAT representing a logical "0" to pre-processing module 118, indicating that the difference between the first reset and signal voltages is not indicative of the saturation condition. The saturation indicator SAT will be described in greater detail below with respect to FIGS. 6 and 7.

In FIG. 2, second S/H circuit 140 receives third reset and signal voltages ($V_{rst3}$ and $V_{sig3}$) of the pixel corresponding to a third integration time that is greater than the first integration time. Second S/H circuit 140 provides the third reset and signal voltages ($V_{rst3}$ and $V_{sig3}$) to pre-processing module 118. Thus, in this embodiment, three integration periods per pixel are employed. Persons skilled in the relevant art(s) will recognize that the example implementation shown in FIG. 2 may be modified to employ any number of integration periods. For instance, any number of S/H circuits may be employed, and any one or more of the sample circuits may be capable of utilizing a respective overwrite operation as described above with reference to first S/H circuit 130.

In an example implementation, first S/H circuit 130 may include a first plurality of capacitors to store the first reset and signal voltages ($V_{rst1}$ and $V_{sig1}$) as the intermediate reset and signal voltages. If the difference between them corresponds to a saturation condition of the pixel, then first S/H circuit 130 overwrites the first reset and signal voltages ($V_{rst1}$ and $V_{sig1}$) with the second reset and signal voltages ($V_{rst2}$ and $V_{sig2}$) as intermediate reset and signal voltages. In this implementation, second S/H circuit 140 may include a second plurality of capacitors to store the third reset and signal voltages ($V_{rst3}$ and $V_{sig3}$).

Pre-processing module 118 reads the intermediate reset and signal voltages from first S/H circuit 130 and the third reset and signal voltages from second S/H circuit 140. Persons skilled in the relevant art(s) will recognize that the intermediate reset and signal voltages and the third reset and signal voltages may be read in any order.

Pre-processing module 118 includes first and second low gain modules 202, 212, first and second high gain modules 204, 214, first and second multiplexers 206, 216, first and second analog-to-digital converters (ADCs) 208, 218, and a third multiplexer 222. First, second, and third multiplexers 206, 216, 222 each have an associated comparator for performing the comparator operations described with respect to each. In another example, any two or more of first, second, and third multiplexers 206, 216, 222 may share a common associated comparator. First and second multiplexers 206, 216 have respective output feeds into respective first and second analog-to-digital converters (ADCs) 208, 218, which are connected to a reference voltage $V_{ref}$, which represents an upper limit of an operating voltage range of the first and second ADCs 208, 218. The reference voltage $V_{ref}$ may also be provided to first and second multiplexers 206, 216, respectively. The reference voltage $V_{ref}$ may be 1.0 volts (V), for example, though persons skilled in the relevant art(s) will recognize that the reference voltage $V_{ref}$ may be any value. Further explanation of the reference voltage $V_{ref}$ is provided in the following discussion.

First low gain module 202 differentially amplifies the intermediate reset and signal voltages from first S/H circuit 130 using a first gain to provide a low gain intermediate differential signal. First high gain module 204 differentially amplifies the intermediate reset and signal voltages using a second gain to provide a high gain intermediate differential signal. The second gain is greater than the first gain. For example, the first gain may be approximately one. In this example, the second gain may be a value greater than one, including but not limited to four, eight, or sixteen. Persons skilled in the relevant art(s) will recognize that the first and second gains may be any suitable values.

First multiplexer 206 selects either the low gain intermediate differential signal or the high gain intermediate differential signal for conversion by first ADC 208 based on a relationship between the high gain intermediate differential signal and the reference threshold $V_{ref}$. First multiplexer 206 sets a first gain indicator (FGI) to indicate which of the low gain intermediate differential signal and the high gain intermediate differential signal is selected. If the high gain intermediate differential signal is greater than the reference threshold $V_{ref}$, then first multiplexer 206 selects the low gain intermediate differential signal as a qualifying intermediate differential signal for conversion by first ADC 208 and sets the first gain indicator to a first state (e.g., a logical "1"). If the high gain intermediate differential signal is less than the reference threshold $V_{ref}$, then first multiplexer 206 selects the high gain intermediate differential signal as the qualifying intermediate differential signal and sets the first gain indicator to a second state (e.g., a logical "0").

First ADC 208 converts an analog representation of the qualifying intermediate differential signal ($V_{pixel1}$ or $V_{pixel2}$), respectively corresponding to the output of first low gain module 202 and first high gain module 204, to a digital representation of the qualifying intermediate differential signal. First ADC 208 is configured to append the first gain indicator FGI and the saturation indicator SAT to the digital representation of the qualifying intermediate differential signal, which is then provided as a first input signal for third multiplexer 222. In this manner, the digital pixel signal provided by first ADC 208 is identified as either digital differential signal $V_{pixel1}$, which corresponds to the first integration time, or digital differential signal $V_{pixel2}$, which corresponds to the second integration time, in accordance with the SAT flag, and by the gain applied (G_lo or G_hi) in accordance with the first gain indicator FGI.

Second low gain module 212 differentially amplifies the third reset and signal voltages from second S/H circuit 140 using the first gain to provide a low gain third differential signal. Second high gain module 214 differentially amplifies the third reset and signal voltages using the second gain to provide a high gain third differential signal.

Second multiplexer 216 selects either the low gain third differential signal or the high gain third differential signal for conversion by second ADC 218 based on a relationship between the high gain third differential signal and the reference threshold $V_{ref}$. Second multiplexer 216 sets a second gain indicator SGI to indicate which of the low gain third differential signal and the high gain third differential signal is selected. If the high gain third differential signal is greater than the reference threshold $V_{ref}$, then second multiplexer 216 selects the low gain third differential signal as a qualifying third differential signal $V_{pixel3}$ for conversion by second ADC 218 and sets the second gain indicator SGI to a first state (e.g., a logical "1"). If the high gain third differential signal is less than the reference threshold $V_{ref}$, then second multiplexer 216 selects the high gain third differential signal as the qualifying third differential signal $V_{pixel3}$ and sets the second gain indicator to a second state (e.g., a logical "0").

Second ADC 218 converts an analog representation of the qualifying third differential signal $V_{pixel3}$ to a digital representation of the qualifying third differential signal $V_{pixel3}$. Second ADC 218 is configured to append the second gain indicator SGI to the digital representation of the qualifying third differential signal $V_{pixel3}$, which is then provided as a second input signal for third multiplexer 222. The $V_{pixel3}$ as provided by second ADC 218 has an associated gain indicator indicating which of G_lo and G_hi was applied to the differential signal $V_{pixel3}$.

Line buffers 224 temporarily store entire rows of pixel data, including the digital representation of the qualifying third differential signal $V_{pixel3}$ for each pixel of the respective rows. Line buffers 224 are used to align the readout of the digital representations of the qualifying third differential signal $V_{pixel3}$ and the corresponding qualifying intermediate differential signal ($V_{pixel1}$ or $V_{pixel2}$) for each pixel for selection by third multiplexer 222. The digital data stored in line buffers 224 corresponds to the rows of pixels in pixel array 110 indicated by the arrow.

Third multiplexer 222 selects either the qualifying intermediate signal ($V_{pixel1}$ or $V_{pixel2}$) from first ADC 208 or the qualifying third signal $V_{pixel3}$ from second ADC 218 as a pixel output signal based on whether the qualifying third signal $V_{pixel3}$ corresponds to a saturation condition of the pixel. If the qualifying third signal $V_{pixel3}$ corresponds to the saturation condition, then third multiplexer 222 selects the qualifying intermediate signal $V_{pixel1}$ or $V_{pixel2}$ as the output signal. If the qualifying third signal $V_{pixel3}$ does not correspond to the saturation condition, then third multiplexer 222 selects the qualifying third signal $V_{pixel3}$ as the output signal.

For example, third multiplexer 222 may compare the qualifying third signal $V_{pixel3}$ to a saturation threshold $V_{sat}$ that represents the saturation condition. In this example, if the qualifying third signal $V_{pixel3}$ is greater than the saturation threshold $V_{sat}$, then third multiplexer 222 selects the qualifying intermediate signal ($V_{pixel1}$ or $V_{pixel2}$) from first ADC 208 as the output signal. If the qualifying third signal $V_{pixel3}$ is less than the saturation threshold $V_{sat}$, then third multiplexer 222 selects the qualifying third signal $V_{pixel3}$ from second ADC 218 as the output signal. The saturation threshold $V_{sat}$ utilized by third multiplexer 222 may be the same or different from the saturation threshold utilized by first S/H circuit 130. For instance, the saturation threshold $V_{sat}$ utilized by third multiplexer 222 may be a digital representation of the saturation threshold utilized by first S/H circuit 130, in which case the saturation thresholds are said to be the same.

Third multiplexer 222 is configured to append an integration time indicator to the output signal, indicating which of the qualifying third signal and the qualifying intermediate signal is selected as the output signal. For example, if third multiplexer 222 selects the qualifying intermediate signal as the output signal, third multiplexer 222 appends the integration time indicator having a first state (e.g., a logical "1") to the output signal, indicating that the integration time is either the first or second integration time. In this example, the output signal includes not only the appended integration time indicator having the first state, but also the first gain indicator FGI and the saturation indicator SAT appended by first ADC 208. Thus, SAT information indicates which of the first and second integration periods corresponds to the output signal from third multiplexer 222.

On the other hand, if third multiplexer 222 selects the qualifying third signal as the output signal, third multiplexer 222 appends the integration time indicator having a second state (e.g., a logical "0") to the output signal, indicating that the integration time is the third integration time. In this instance, the output signal includes not only the appended integration time indicator having the second state, but also the second gain indicator SGI appended by second ADC 218.

The indicators appended to the output signal are used by normalization module 122 of FIG. 1 to normalize pixel signal values after one of the digital pixel signals $V_{pixel1}$, $V_{pixel2}$, or $V_{pixel3}$ respectively corresponding to the three integration periods is passed to image processor 120. For instance, a first combination of indicator values may indicate that the output signal is to be multiplied by a first factor, a second combination of indicator values may indicate that the output signal is to be multiplied by a second factor, and so on. Each pixel is characterized by its own combination of indicator values. Table 1 lists the possible combinations of indicators and the corresponding information that each combination provides to normalization module 122.

TABLE 1

| Integration Time Indicator | First Gain Indicator, FGI | Second Gain Indicator, SGI | Saturation Indicator, SAT | Corresponding Information |
|---|---|---|---|---|
| 1 | 1 | N/A | 1 | Short integration time, Low gain |
| 1 | 0 | N/A | 1 | Short integration time, High gain |
| 1 | 1 | N/A | 0 | Medium integration time, Low gain |
| 1 | 0 | N/A | 0 | Medium integration time, High gain |
| 0 | N/A | 1 | N/A | Long integration time, Low gain |
| 0 | N/A | 0 | N/A | Long integration time, High gain |

As an example, the first line of Table 1 shows that an integration time indicator of "1", a first gain indicator of "1", and a saturation indicator SAT of "1" indicates that the pixel signal corresponds to a short integration time and a low gain. In Table 1, terms such as short, medium, long, high, and low are provided as relative terms, rather than as absolute terms. For example, the short integration time need not necessarily be short, and the long integration time need not necessarily be long. Rather, the short integration time is merely less than the medium integration time, which is less than the long integration time. Similarly, the high gain need not necessarily be high, and the low gain need not necessarily be low. Rather, the high gain is merely greater than the low gain. Further discussion of the normalization of pixel signal values is provided below with respect to FIG. 13.

In FIG. 2, sensor readout module 114 is shown to include a single pre-processing module 118 for illustrative purposes. Persons skilled in the relevant art(s) will recognize that sensor readout module 114 may include any number of pre-processing modules 118. For example, each pre-processing module 118 may be assigned to any number of column output lines of an imager, such as imager 100. For instance, sensor readout module 114 may include a pre-processing module 118 for each column output line of the imager.

In FIG. 2, pointers P1 and P2 are shown which are sequentially controlled to start and stop integration and to read rows of reset and signal voltages for pixels of pixel array 110. Pointers P1 and P2 travel in parallel along pixel array 110', pointing to respective rows of pixel array 110'. In the illustration of FIG. 2, pointer P1 leads pointer P2 down successive rows of pixel array 110'. Once a pointer P1 or P2 reaches the bottom of pixel array 110', the pointer P1 or P2 returns to the top of pixel array 110' and continues pointing to successive rows. The pointer P1 or P2 need not necessarily return to the top of pixel array 110' immediately. For instance, the pointer P1 or P2 may be paused (i.e., delayed) upon reaching the bottom of pixel array 110' to increase an associated integration time. The duration of the pause may be predetermined, though the embodiments described herein are not limited in this respect.

A reset pointer may be included at any point along pixel array 110' to facilitate defining an integration time. For example, a reset pointer that is placed between pointers P1 and P2 may be used to stop an integration that is started by pointer P1, thereby reducing the duration of the integration (i.e., reducing the associated integration time), which otherwise would be stopped by pointer P2. In another example, a reset pointer may be placed "outside" of the pointers P1 and P2, such that the reset pointer is capable of stopping an integration that is started by pointer P2, reducing the duration of the integration, which otherwise would be stopped by pointer P1.

The time between a reset operation of a photosensor and a photosensor charge read operation is known as an integration time for a pixel. A longer integration time allows more light to be captured, as compared to a shorter integration time. Thus, if the light intensity is relatively high, a longer integration time may lead to a saturation condition for the pixel. The embodiments described herein allow reset $V_{rst}$ and signal $V_{sig}$ voltages corresponding to a plurality of different integration times to be processed for each pixel of pixel array 110 to facilitate accurate reproduction of the image.

FIGS. 3-5 and 16 are flowcharts of methods 300, 400, 500, and 1600 of reading reset and signal voltages corresponding to different integration times in accordance with embodiments disclosed herein. The embodiments described herein, however, are not limited to the descriptions provided by the flowcharts. Rather, it will be apparent to persons skilled in the relevant art(s) from the teachings provided herein that other functional flows are within the scope and spirit of the disclosed embodiments.

Methods 300, 400, 500, and 16 will be described with continued reference to sensor readout module 114 and components thereof described above in reference to FIGS. 1 and 2, though the methods are not limited to those embodiments.

Figure 3:
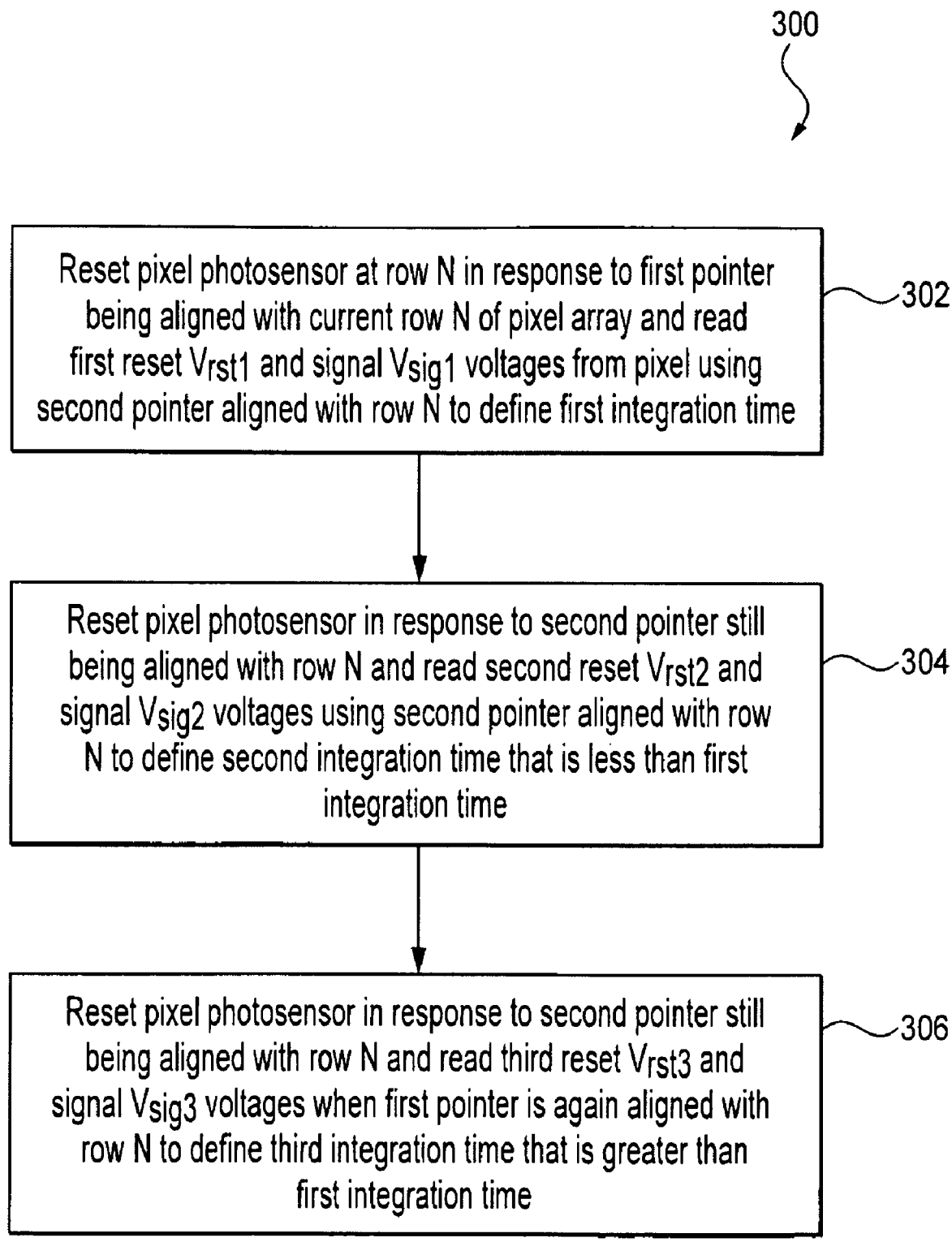
FIGS. 3-5 and 16 are flowcharts of methods of reading reset and signal voltages corresponding to different integration times in accordance with embodiments disclosed herein.

Referring now to FIG. 3, a pixel photosensor at row N is reset in response to a first pointer P1 being aligned with a current row N of a pixel array and first reset $V_{rst1}$ and signal $V_{sig1}$ voltages are read from the pixel using a second pointer P2 aligned with row N to define a first integration time at block 302. For instance, pointer P1 of FIG. 2 may be aligned with row N at a first time. The pixel photosensor may be reset while pointer P1 is aligned with row N. As pointers P1 and P2 continue to travel along a pixel array, pointer P2 becomes aligned with row N at a second time. The first integration may then end and first reset and signal voltages $V_{rst1}$, $V_{sig1}$ may be read using pointer P2 while pointer P2 is aligned with row N. The first integration time therefore corresponds to the number of rows between pointers P1 and P2.

At block 304, the pixel photosensor is then reset in response to the second pointer P2 still being aligned with row N and another integration period begins after which second reset $V_{rst2}$ and signal $V_{sig2}$ voltages are read using the second pointer P2 aligned with row N to define a second integration time that is less than the first integration time. The pixel photosensor may be reset again at a third time while pointer P2 is still aligned with the row. The second integration time is therefore less than or equal to one row time.

At block 306, the pixel photosensor is reset after $V_{rst2}$ and $V_{sig2}$ are read in response to the second pointer P2 still being aligned with row N and third reset $V_{rst3}$ and signal $V_{sig3}$ voltages are read when the first pointer P1 is again aligned with row N to define a third integration time that is greater than the first integration time. The third integration time therefore corresponds to the number of rows "outside" of the pointers P1 and P2, plus the vertical blanking time.

The integration times discussed herein may be extended indefinitely by increasing the blanking periods. For instance, once the bottom of the pixel array 110 is reached by both pointers P1 and P2, a pause can be implemented to obtain a longer integration time (for the longest integration time) than the time it takes to read out all rows in the pixel array 110.

The order of reading the reset and signal voltages corresponding to the different integration times in FIG. 3 is provided for illustrative purposes. Persons skilled in the relevant art(s) will recognize that the reset $V_{rst}$ and signal $V_{sig}$ voltages may be read in another order. For example, referring to FIG. 16, third reset $V_{rst3}$ and signal $V_{sig3}$ voltages corresponding to a third integration time are read from a pixel in a current row N of a pixel array in response to a first pointer P1 being aligned with row N at block 1602. For instance, the pointer P1 of FIG. 2 may be aligned with row N at a first time. For instance, the third reset $V_{rst3}$ and signal $V_{sig3}$ voltages may be sampled by second S/H circuit 140 and stored in a line buffer 224.

At block 1604, a photosensor of the pixel is reset in response to the first pointer P1 still being aligned with row N and first reset $V_{rst1}$ and signal $V_{sig1}$ voltages are read from the pixel using a second pointer P2 aligned with row N to define a first integration time that is less than the third integration time. For example, pointer P2 may become aligned with row N at a second time as pointers P1 and P2 travel along the pixel array. The first reset $V_{rst1}$ and signal $V_{sig1}$ voltages may be sampled by first S/H circuit 130.

Figure 16:
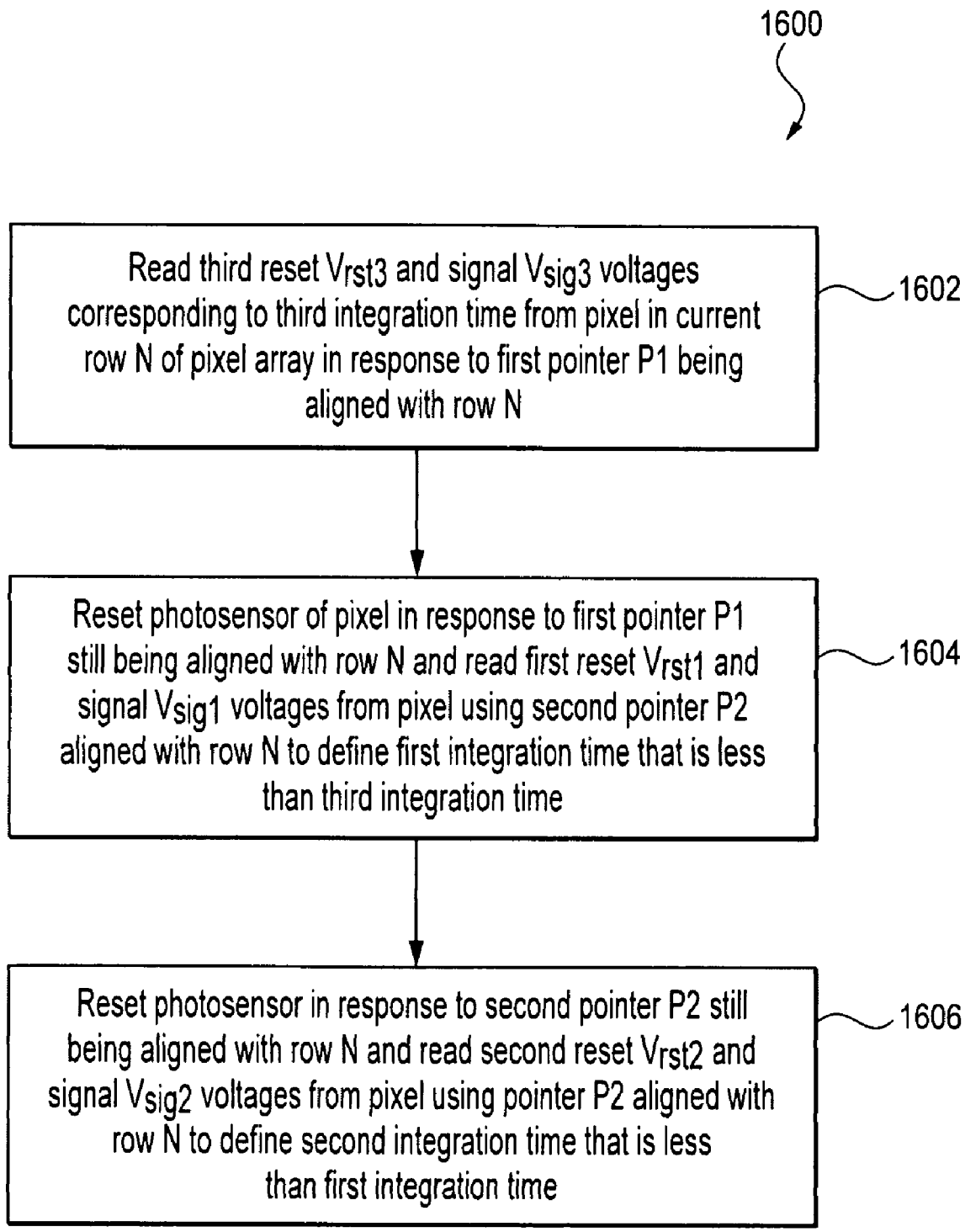

At block 1606, the photosensor is reset in response to the second pointer P2 still being aligned with row N and second reset $V_{rst2}$ and signal $V_{sig2}$ voltages are read from the pixel using pointer P2 aligned with row N to define a second integration time that is less than the first integration time. For instance, the photosensor may be reset at a third time while pointer P2 is still aligned with row N. The second reset $V_{rst2}$ and signal $V_{sig2}$ voltages may be sampled by first S/H circuit 130 and compared to the first reset $V_{rst1}$ and signal $V_{sig1}$ voltages, for example. In the embodiment of FIG. 16, pointer P1 does not have to return to the top of the pixel array in order to become aligned with row N for reading the third reset $V_{rst3}$ and signal $V_{sig3}$ voltages, which may reduce the time necessary to read the three different exposures. It should be noted that three exposures are described with reference to several of the figures, including FIG. 16, for illustrative purposes. Persons skilled in the relevant art(s) will recognize that the embodiments described herein are applicable to any number of exposures.

Figure 4:
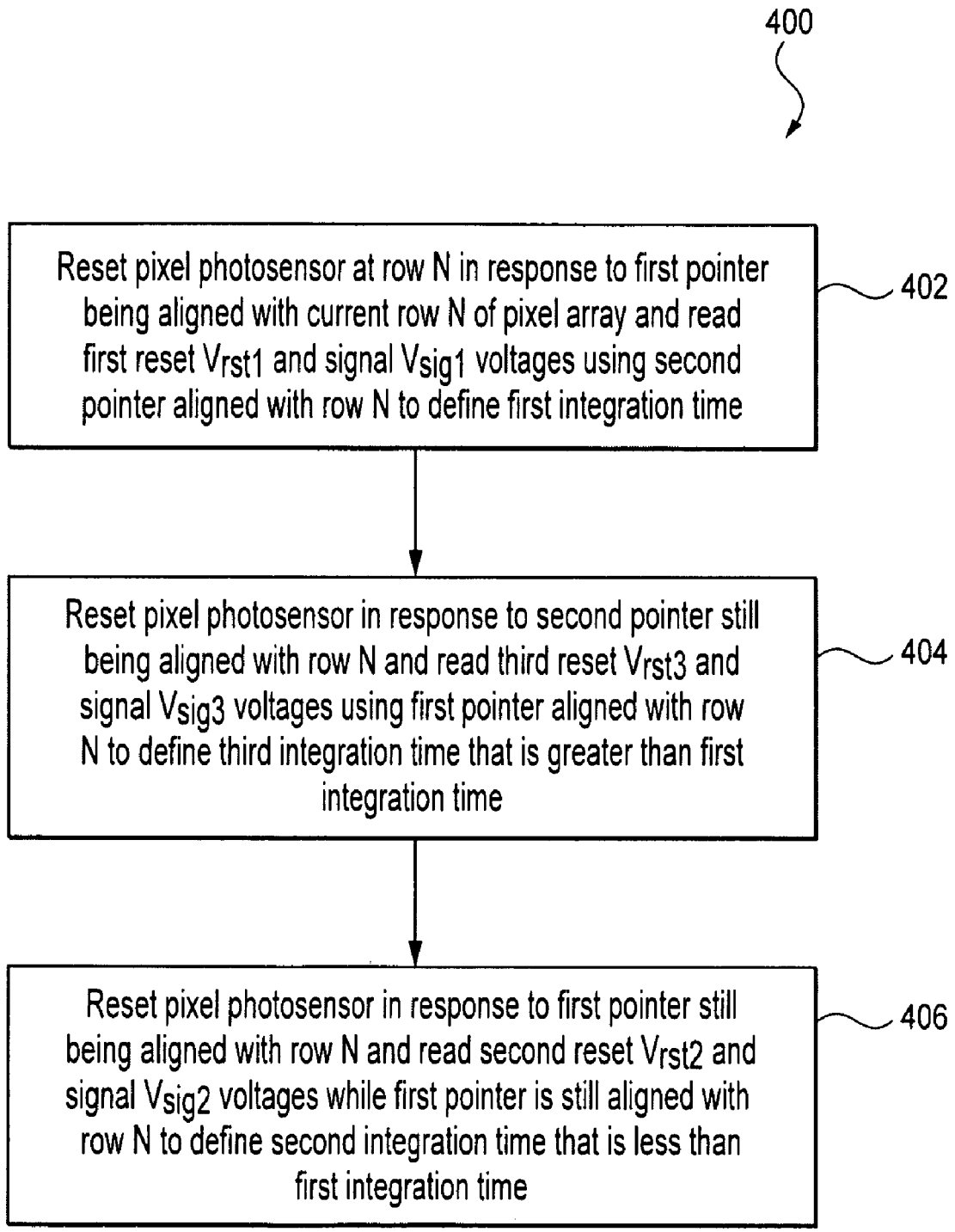

In another example, referring to FIG. 4, a pixel photosensor at row N is reset in response to a first pointer P1 being aligned with a current row N of a pixel array and first reset $V_{rst1}$ and signal $V_{sig1}$ voltages are read from the pixel using a second pointer P2 aligned with row N to define a first integration time at block 402. For instance, pointer P1 of FIG. 2 may be aligned with row N at a first time. The pixel photosensor may be reset while pointer P1 is aligned with row N. As pointers P1 and P2 continue to travel along the pixel array, pointer P2 becomes aligned with row N at a second time. The first integration may then end and the first reset and signal voltages $V_{rst1}$, $V_{sig1}$ may be read using pointer P2 while pointer P2 is aligned with the row.

At block 404, the pixel photosensor is reset in response to the second pointer P2 still being aligned with row N and another integration period begins after which third reset $V_{rst3}$ and signal $V_{sig3}$ voltages are read from the pixel using the first pointer P1 aligned with row N to define a third integration time that is greater than the first integration time. For example, the pixel photosensor may be reset at a third time while pointer P2 is still aligned with row N. As pointers P1 and P2 continue to travel along the pixel array, pointer P1 may return to the top of the pixel array and subsequently become aligned with row N again.

At block 406, the pixel photosensor is reset after $V_{rst3}$ and $V_{sig3}$ are read in response to the first pointer P1 still being aligned with row N and second reset $V_{rst2}$ and signal $V_{sig2}$ voltages are read while the first pointer P1 is still aligned with row N to define a second integration time that is less than the first integration time.

Figure 5:
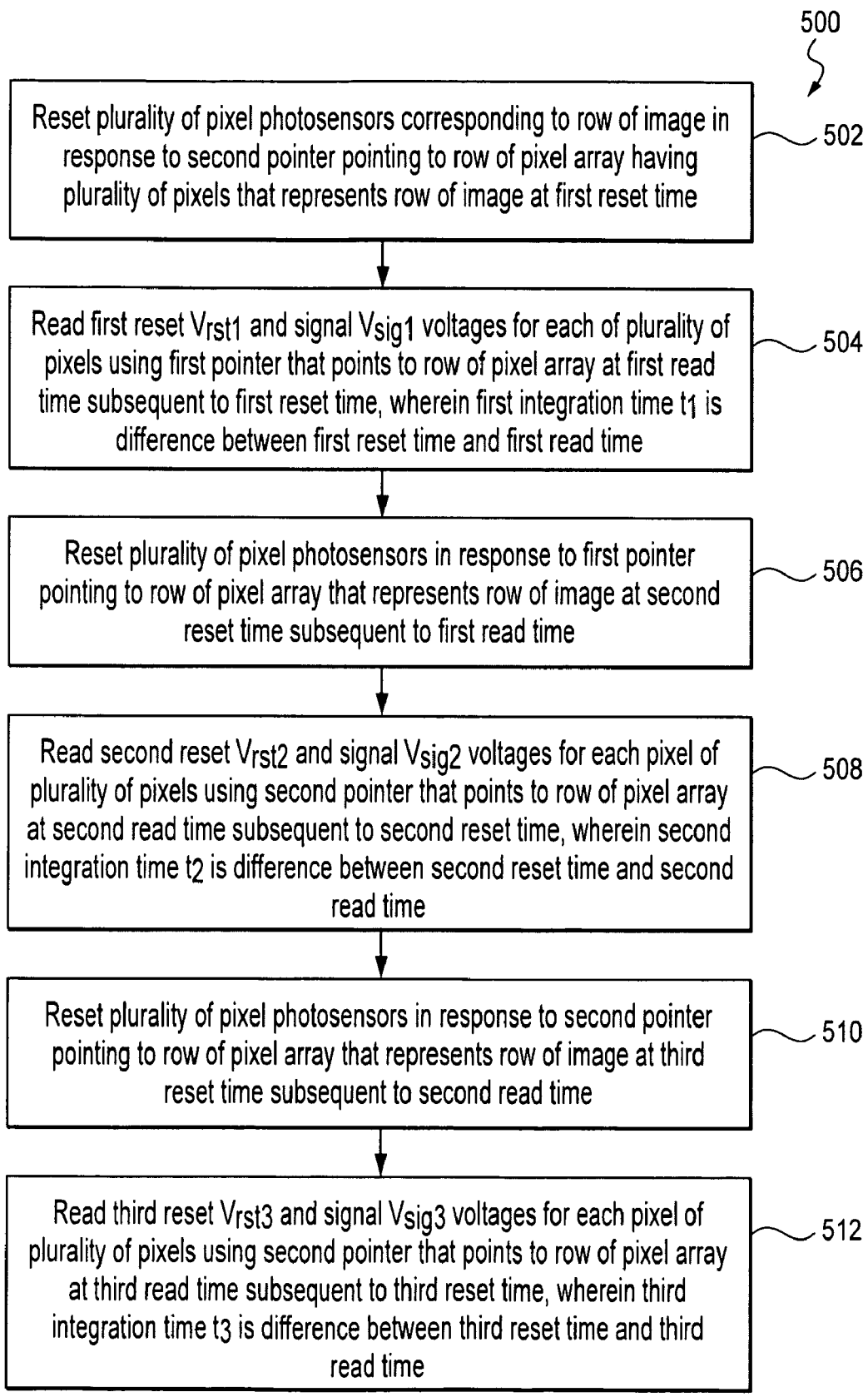

The sensor readout techniques described herein are applicable to any number of pixels. In the methods 300 and 400 described above, reset and signal voltages $V_{rst}$, $V_{sig}$ may be read for any number of pixels in each read operation. FIG. 5 illustrates that the sensor readout techniques described herein are applicable to a plurality of pixels that represents a row of an image. In FIG. 5, a plurality of pixel photosensors corresponding to a row of an image is reset in response to a second pointer P2 pointing to a row of a pixel array having a plurality of pixels that represents the row of the image at a first reset time at block 502. For instance, the plurality of pixel photosensors may be reset at the first reset time while pointer P2 points to a row of a pixel array, such as pixel array 110 or 110', that represents the row of the image.

At block 504, first reset $V_{rst1}$ and signal $V_{sig1}$ voltages for each of the plurality of pixels are read using a first pointer P1 that points to the row of the pixel array at a first read time. The first read time is subsequent to the first reset time, and the first integration time $t_1$ is defined as the difference between the first reset time and the first read time. For instance, pointer P2 may move from the row of pixel array 110 or 110' that represents the row of the image, allowing pointer P1 to point to the row. The first reset $V_{rst1}$ and signal $V_{sig1}$ voltages for each of the plurality of pixels may be read from the respective pixels at the first read time using P1 while P1 points to the row.

At block 506, the plurality of pixel photosensors is reset in response to the first pointer P1 pointing to the row of the pixel array representing the row of the image at a second reset time. The second reset time is subsequent to the first read time. For instance, the plurality of pixel photosensors may be reset after pointer P1 is used to read the first reset $V_{rst1}$ and signal $V_{sig1}$ voltages for each of the plurality of pixels.

At block 508, second reset $V_{rst2}$ and signal $V_{sig2}$ voltages for each pixel of the plurality of pixels are read using the second pointer P2 that points to the row of the pixel array at a second read time. The second read time is subsequent to the second reset time, and the second integration time $t_2$ is defined as the difference between the second reset time and the second read time. For instance, pointer P1 may move from the row of pixel array 110 or 110' that represents the row of the image, allowing pointer P2 to point to the row. The second reset $V_{rst2}$ and signal $V_{sig2}$ voltages for each of the plurality of pixels may be read from the respective pixels at the second read time using P2 while P2 points to the row.

At block 510, the plurality of pixel photosensors is reset in response to the second pointer P2 pointing to the row of the pixel array that represents the row of the image at a third reset time. The third reset time is subsequent to the second read time. For instance, the plurality of pixel photosensors may be reset after pointer P2 is used to read the second reset $V_{rst2}$ and signal $V_{sig2}$ voltages for each pixel of the plurality of pixels.

At block 512, third reset $V_{rst3}$ and signal $V_{sig3}$ voltages for each pixel of the plurality of pixels are read using the second pointer P2 that points to the row of the pixel array at a third read time. The third read time is subsequent to the third reset time, and the third integration time $t_3$ is defined as the difference between the third reset time and the third read time. For instance, after the plurality of pixel photosensors is reset, pointer P2 may read the third reset $V_{rst3}$ and signal $V_{sig3}$ voltages for each pixel of the plurality of pixels while still pointing to the row of pixel array 110 or 110' that represents the row of the image.

In the example embodiment of FIG. 5, the first integration time $t_1$ is greater that the second integration time $t_2$, which is greater than the third integration time $t_3$. The relationships between these integration times are provided for illustrative purposes, and are not intended to be limiting.

Figure 6:
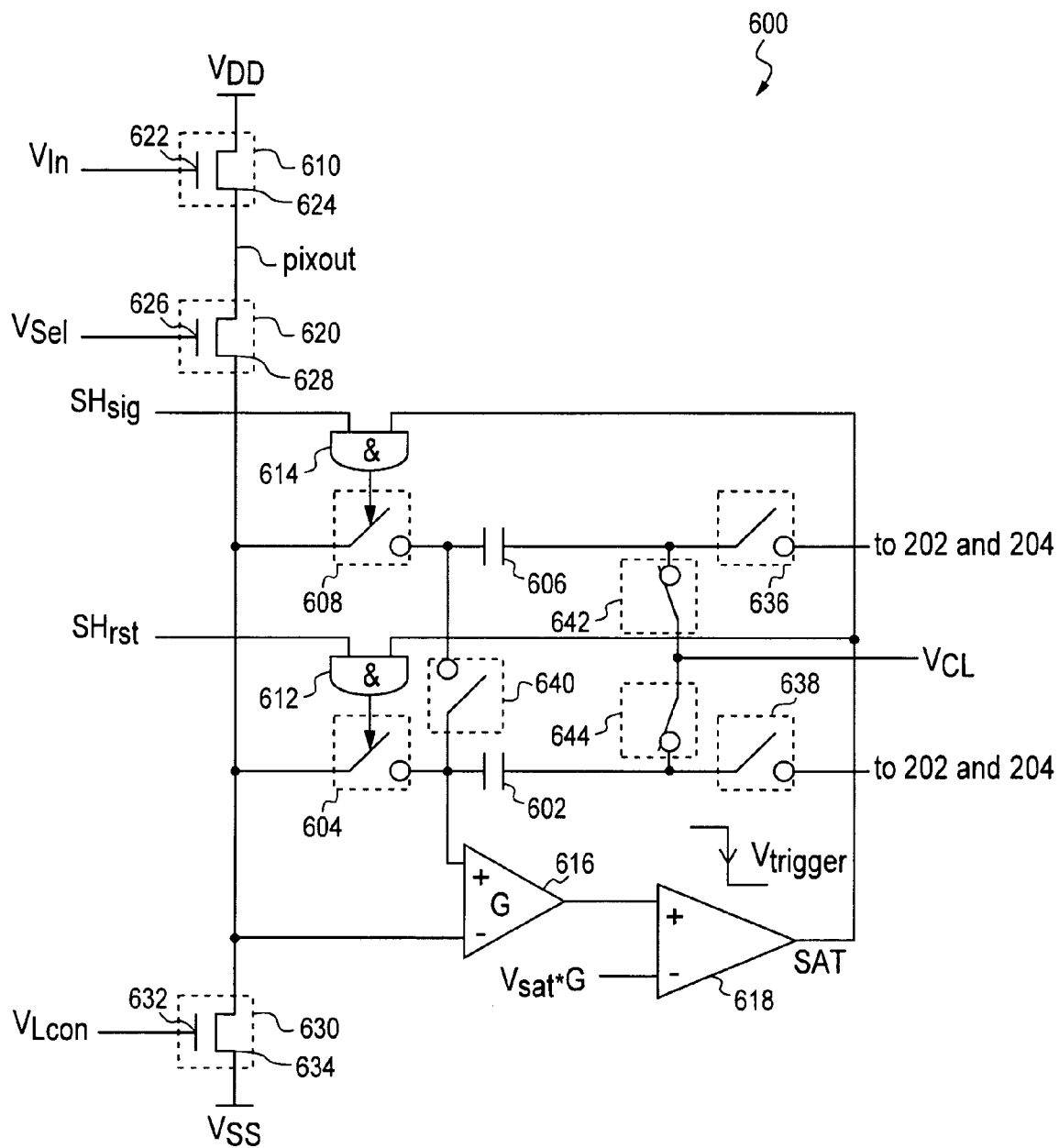
FIGS. 6-8 are example implementations of sampling modules in accordance with embodiments disclosed herein.
Figure 7:
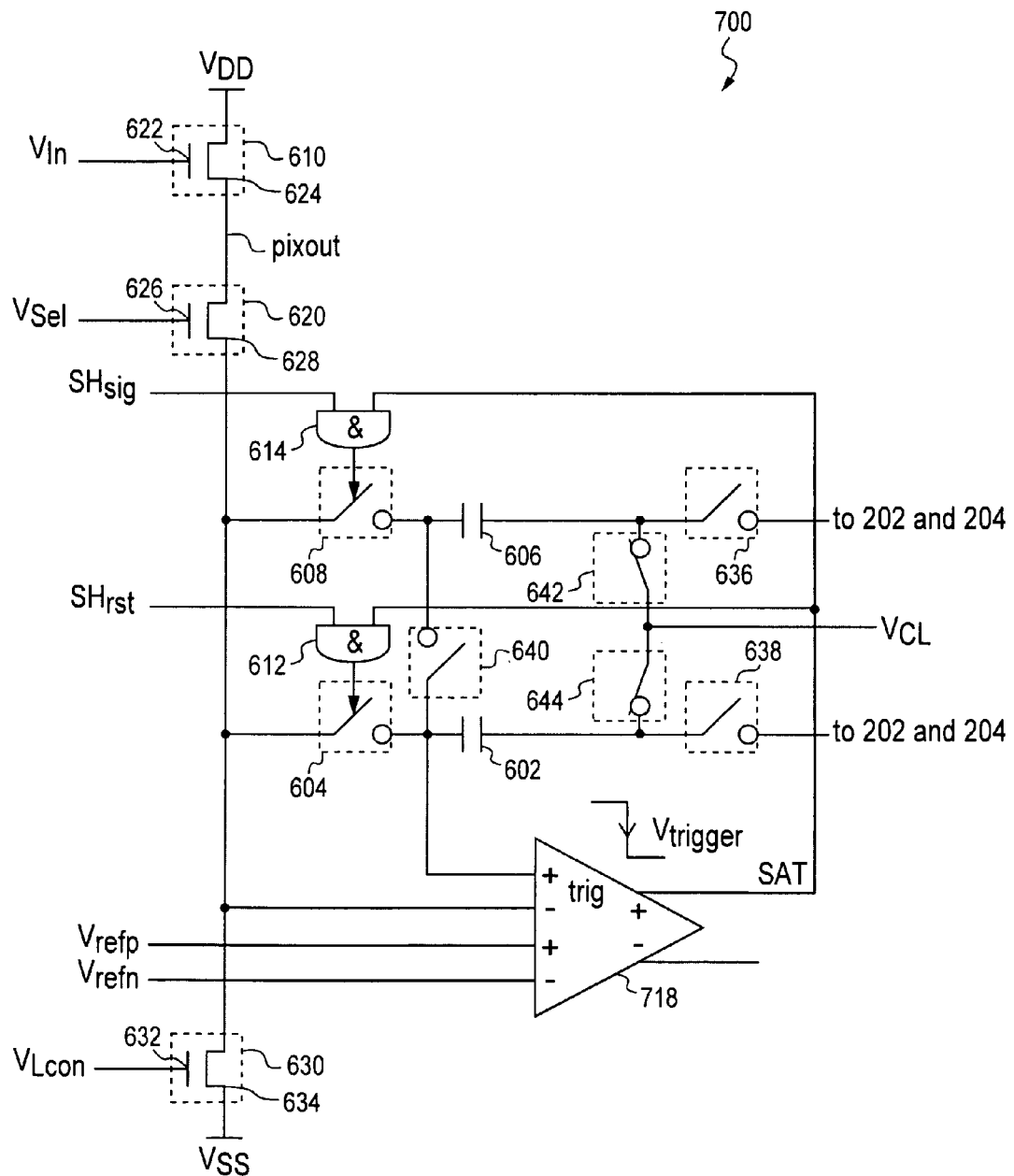
Figure 8:
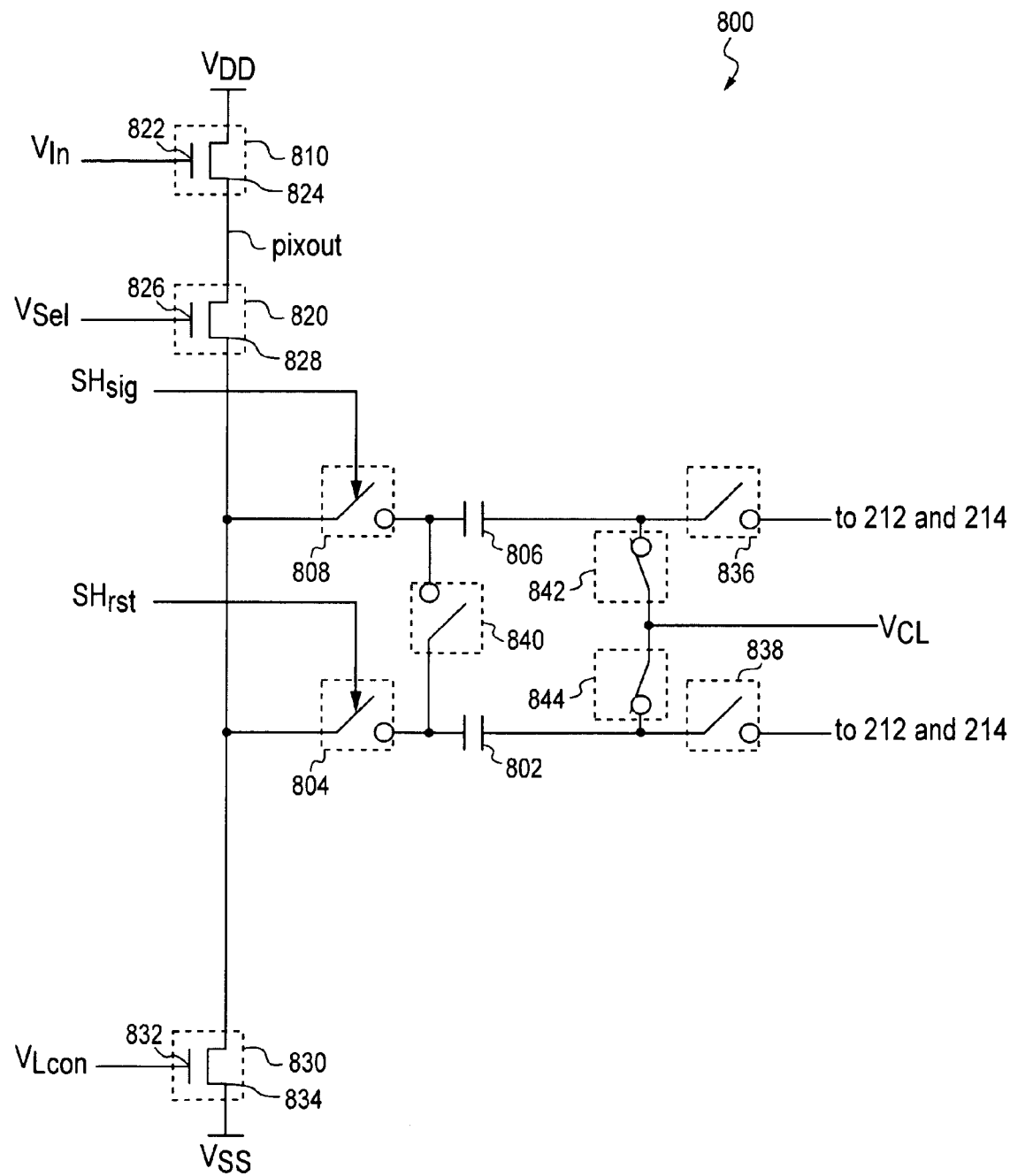

FIGS. 6-8 are example implementations of sampling modules 600, 700, 800 in accordance with embodiments disclosed herein. The example implementations shown in FIGS. 6 and 7 are indicative of sampling modules that may be utilized in first S/H circuit 130 of FIG. 2. First S/H circuit 130 may include one or more of the sampling modules 600, 700 shown in FIGS. 6 and 7. For instance, first S/H circuit 130 may include a sample module 600, 700 for each column output line of an imager, such as imager 100. The example implementation shown in FIG. 8 is indicative of a sample module that may be utilized in second S/H circuit 140 of FIG. 2. Second S/H circuit 140 may include one or more of the sample module 800 shown in FIG. 8. For instance, second S/H circuit 140 may include a sample module 800 for each column output line of an imager, such as imager 100. The example implementations shown in FIGS. 6-8 are provided for illustrative purposes and are not intended to be limiting.

Referring now to FIG. 6, sample module 600 is configured to sample first reset and signal voltages ($V_{rst1}$ and $V_{sig1}$, respectively) from a pixel, corresponding to a first integration time. Sample module 600 is further configured to selectively sample second reset and signal voltages ($V_{rst2}$ and $V_{sig2}$, respectively) from the pixel, corresponding to a second integration time that is less than the first integration time, depending on whether the difference between the first reset and signal voltages exceeds a saturation threshold that indicates a saturation condition of the pixel. If the difference between the first reset and signal voltages exceeds the saturation threshold, then sample module 600 samples the second reset and signal voltages to replace the first reset and signal voltages. Otherwise, sample module 600 does not sample the second reset and signal voltages.

In FIG. 6, sample module 600 includes a transistor 610, row select transistor 620, first and second capacitors 602, 606, first and second switches 604, 608, first and second AND gates 612, 614, a gain module 616, a comparator 618, crowbar switch 640, clamping switches 642, 644, column select switches 636, 638, and load transistor 630. Transistor 610 includes a control node 622 and an output node 624. As shown in FIG. 6, an input signal $V_{In}$ is received at control node 622 of transistor 610, causing a pixout signal to be provided at output node 624. The pixout signal may be a reset voltage (i.e., $V_{rst1}$ or $V_{rst2}$) or an image signal voltage (i.e., $V_{sig1}$ or $V_{sig2}$) for the pixel. Row select transistor 620 is turned on via control signal $V_{Sel}$ at input node 626 when the row of the corresponding pixel is selected for readout, enabling the pixout signal to be provided at output node 628. The following discussion presumes that row select transistor 620 is turned on.

In the embodiment of FIG. 6, the first reset voltage $V_{rst1}$ of the pixel is provided at output node 624 when the received input signal $V_{In}$ is a reset voltage from the pixel. The first reset voltage $V_{rst1}$ corresponds to the first integration time. A sample reset indicator $SH_{rst}$ indicates whether the first reset voltage $V_{rst1}$ is selected for sampling. For instance, the sample reset indicator $SH_{rst}$ having a first state representing a logical "1" indicates that the first reset voltage $V_{rst1}$ is selected for sampling, and the sample reset indicator $SH_{rst}$ having a second state representing a logical "0" indicates that the first reset voltage $V_{rst1}$ is not selected for sampling. First AND gate 612 performs a logical AND operation using the sample reset indicator $SH_{rst}$ and a saturation indicator SAT to provide a control signal that is capable of opening and closing first switch 604.

Comparator 618 is initially in a reset state, meaning that the saturation indicator SAT initially represents a logical "1". Comparator 618 is configured to remain in the reset state until comparator 618 is triggered, as will be described in further detail below. When the first reset voltage $V_{rst1}$ of the pixel is provided at output node 624, the sample reset indicator $SH_{rst}$ is set to a logical "1". The output of first AND gate 612 closes first switch 604 in response to the sample reset indicator $SH_{rst}$ and the saturation indicator SAT each representing a logical "1", causing the first reset voltage $V_{rst1}$ to be sampled onto first capacitor 602.

The sample reset indicator $SH_{rst}$ is set to a logical "0" to cause first AND gate to open first switch 604, thereby disconnecting first capacitor 602 from output node 624. The first signal voltage $V_{sig1}$ of the pixel is provided at output node 624 of transistor 610 when the received input signal $V_{In}$ is an image signal voltage output from the pixel. The first signal voltage $V_{sig1}$ corresponds to the first integration time.

A sample signal indicator $SH_{sig}$ indicates whether the first signal voltage $V_{sig}$ is selected for sampling. For instance, the sample signal indicator $SH_{sig}$ having a first state representing a logical "1" indicates that the first signal voltage $V_{sig1}$ is selected for sampling, and the sample signal indicator $SH_{sig}$ having a second state representing a logical "0" indicates that the first signal voltage $V_{sig1}$ is not selected for sampling. Second AND gate 614 performs a logical AND operation using the sample signal indicator $SH_{sig}$ and the saturation indicator SAT to provide a control signal that is capable of opening and closing second switch 608.

Because comparator 618 is initially in the reset state and comparator 618 has not yet been triggered, the saturation indicator SAT having a state representing a logical "1" is provided to second AND gate 614. When the first signal voltage $V_{sig1}$ of the pixel is provided at output node 624, the sample signal indicator $SH_{sig}$ is set to a logical "1". The output of second AND gate 614 closes second switch 608 in response to the sample signal indicator $SH_{sig}$ and the saturation indicator SAT each representing a logical "1", causing the first signal voltage $V_{sig1}$ to be sampled onto second capacitor 606. First and second capacitors 602, 606 are shown to be coupled to a clamping voltage $V_{CL}$, which may be any value.

A trigger signal $V_{trigger}$ triggers comparator 618 after the sample signal indicator $SH_{sig}$ is set to the logical "1" and before the sample reset indicator $SH_{rst}$ is set to the logical "1" for a second time, causing comparator 618 to determine whether the difference between the first reset voltage $V_{rst1}$ and the first signal voltage $V_{sig1}$ exceeds a saturation threshold that indicates a saturation condition of the pixel. The first signal voltage $V_{sig1}$ is provided to a negative input terminal of gain module 616. A positive input terminal of gain module 616 is coupled between first switch 604 and first capacitor 602, such that the first reset voltage $V_{rst1}$ is provided from first capacitor 602 to the positive input terminal of gain module 616. Gain module 616 generates an amplified signal based on the difference between the first reset voltage $V_{rst1}$ and the first signal voltage $V_{sig1}$. The gain G of gain module 616 can be any value, for example one, less than one, or more than one. For instance, the gain G of gain module 616 may be selected based on the dynamic range of sample module 600.

In FIG. 6, $V_{sat}$ represents the saturation threshold. The saturation threshold $V_{sat}$ is multiplied by a gain G that is equal to the gain G of gain module 616 to provide an amplified saturation threshold at an inverting input terminal of comparator 618. The amplified signal from gain module 616 is provided at the non-inverting input terminal of comparator 618. Comparator 618 compares the amplified signal and the amplified saturation threshold to provide the saturation indicator SAT having a state that depends upon whether the amplified signal exceeds the amplified saturation threshold. If the amplified signal is greater than the amplified saturation threshold, the state of the saturation indicator SAT remains unchanged. In other words, the state of the saturation indicator SAT continues to represent a logical "1". If the amplified signal is less than the amplified saturation threshold, the state of the saturation indicator SAT is set to a logical "0".

The sample signal indicator $SH_{sig}$ is set to a logical "0" to cause second AND gate 614 to open second switch 608, thereby disconnecting second capacitor 606 from output node 624. The second reset voltage $V_{rst2}$ of the pixel is provided at output node 624 of transistor 610 when the received input signal $V_{In}$ is again a reset voltage output from the pixel. The second reset voltage $V_{rst2}$ corresponds to the second integration time, which is less than the first integration time. The sample reset indicator $SH_{rst}$ is set to a logical "1" for the second time. First AND gate 612 performs a logical AND operation using the sample reset indicator $SH_{rst}$ and the saturation indicator SAT. If the state of the saturation indicator SAT represents a logical "0", the output of first AND gate 612 does not close first switch 604. Thus, the second reset voltage $V_{rst2}$ is not sampled onto first capacitor 602. On the other hand, if the state of the saturation indicator SAT represents a logical "1", the output of first AND gate 612 closes first switch 604, causing the second reset voltage $V_{rst2}$ to be sampled onto first capacitor 602.

The sample reset indicator $SH_{rst}$ is set to a logical "0" to cause the output of first AND gate 612 to open first switch 604, thereby disconnecting first capacitor 602 from output node 624. The second signal voltage $V_{sig2}$ of the pixel is provided at output node 624 of transistor 610 when the received input signal $V_{In}$ is again an image signal voltage output from the pixel. The second signal voltage $V_{sig2}$ corresponds to the second integration time. The sample signal indicator $SH_{sig}$ is set to a logical "1". Second AND gate 614 performs a logical AND operation using the sample signal indicator $SH_{sig}$ and the saturation indicator SAT. If the state of the saturation indicator SAT represents a logical "0", the output of second AND gate 614 does not close second switch 608. Thus, the second signal voltage $V_{sig2}$ is not sampled onto second capacitor 606. On the other hand, if the state of the saturation indicator SAT represents a logical "1", the output of second AND gate 614 closes second switch 608, causing the second signal voltage $V_{sig2}$ to be sampled onto second capacitor 606.

The sampling operations described above with reference to FIG. 6 occur during horizontal blanking. During sampling, crowbar switch 640 and column select switches 636, 638 are open, and clamping switches 642, 644 are closed.

The voltages stored in first and second capacitors 602, 606 may be read out when horizontal blanking is not occurring. During pixel readout, crowbar switch 640 and column select switches 636, 638 pulse once for each column of pixel array 110, and clamping switches 642, 644 are open. Thus, for each column, crowbar switch 640 shorts the input sides of first and second capacitors 602, 606 together while the output sides of first and second capacitors 602, 606 are connected to the virtual grounds of low gain module 202 and high gain module 204.

Although AND logic is utilized in the implementation of FIG. 6, persons skill in the relevant art(s) will recognize that any type(s) of logic may be used in lieu of, or in addition to, the logical AND gates shown. Other types of logic include but are not limited to OR, NAND, NOR, XOR, etc. logic.

FIG. 7 shows an example implementation of a sample module 700 having a differential configuration according to an embodiment disclosed herein. Sample module 700 operates substantially the same as sample module 600 of FIG. 6, except that differential comparator 718 replaces gain block 616 and comparator 618. Differential comparator 718 compares $(V_{rst}-V_{sig})$ to $(V_{refp}-V_{refn})$. In FIG. 7, the saturation indicator SAT is shown to be provided at the positive output of differential comparator 718 for illustrative purposes, though persons skilled in the relevant art(s) will recognize that the saturation indicator SAT may alternatively be provided at the negative output of differential comparator 718. As illustrated in FIG. 7, incorporation of differential comparator 718 eliminates the need for a gain block, which may have any of a variety of benefits, including but not limited to less susceptibility to power supply noise, reduced power consumption, space, and/or cost, etc.

The output polarity of sample module 700 is a matter of definition and implementation, and the logic levels may be determined by one or more power supplies. For example, if the negative supply of differential comparator 718 is at a ground potential (0V) and the positive supply is at a value $V_{AA}$, differential comparator 718 may be configured to operate in accordance with the following equations 1 and 2:

$$(V_{rst}-V_{sig}) > (V_{refp}-V_{refn}) => (V_{outp}-V_{outn}) = V_{AA} \qquad \text{Equation 1}$$

$$(V_{rst}-V_{sig}) < (V_{refp}-V_{refn}) => (V_{outp}-V_{outn}) = -V_{AA} \qquad \text{Equation 2}$$

Alternatively, differential comparator 718 may be configured to operate in accordance with the following equations 3 and 4:

$$(V_{rst} - V_{sig}) < (V_{refp} - V_{refn}) \Rightarrow (V_{outp} - V_{outn}) = V_{AA} \quad \text{Equation 3}$$

$$(V_{rst} - V_{sig}) > (V_{refp} - V_{refn}) \Rightarrow (V_{outp} - V_{outn}) = -V_{AA} \quad \text{Equation 4}$$

FIG. 8 is another example implementation of a sample module 800 in accordance with an embodiment disclosed herein. Sample module 800 is configured to sample third reset and signal voltages of the pixel, corresponding to the third integration time that is greater than the first integration time discussed above with respect to FIGS. 6 and 7. In FIG. 8, sample module 800 includes a transistor 810, first and second capacitors 802, 806, and first and second switches 804, 808. Transistor 810 includes a control node 822 and an output node 824. As shown in FIG. 8, an input signal $V_{In}$ is received at control node 822 of transistor 810, causing a pixout signal to be provided at output node 824. The pixout signal may be the third reset voltage $V_{rst3}$ or the third image signal voltage $V_{sig3}$ for the pixel.

In the embodiment of FIG. 8, the third reset voltage $V_{rst3}$ of the pixel is provided at output node 824 when the received input signal $V_{In}$ is a reset voltage output from the pixel. A sample reset indicator $SH_{rst}$ indicates whether the third reset voltage $V_{rst3}$ is selected for sampling. For instance, the sample reset indicator $SH_{rst}$ having a first state representing a logical "1" indicates that the third reset voltage $V_{rst3}$ is selected for sampling, and the sample reset indicator $SH_{rst}$ having a second state representing a logical "0" indicates that the third reset voltage $V_{rst3}$ is not selected for sampling. When the third reset voltage $V_{rst3}$ of the pixel is provided at output node 824, the sample reset indicator $SH_{rst}$ is set to a logical "1", causing the third reset voltage $V_{rst3}$ to be sampled onto first capacitor 802.

The sample reset indicator $SH_{rst}$ is set to a logical "0" to open first switch 804, thereby disconnecting first capacitor 802 from output node 824. The third signal voltage $V_{sig3}$ of the pixel is provided at output node 824 of transistor 810 when the received input signal $V_{In}$ is an image signal voltage output from the pixel. A sample signal indicator $SH_{sig}$ indicates whether the third signal voltage $V_{sig3}$ is selected for sampling. For instance, the sample signal indicator $SH_{sig}$ having a first state representing a logical "1" indicates that the third signal voltage $V_{sig3}$ is selected for sampling, and the sample signal indicator $SH_{sig}$ having a second state representing a logical "0" indicates that the third signal voltage $V_{sig3}$ is not selected for sampling. When the third signal voltage $V_{sig3}$ of the pixel is provided at output node 824, the sample signal indicator $SH_{sig}$ is set to a logical "1", causing the third signal voltage $V_{sig3}$ to be sampled onto second capacitor 806.

The third reset and signal voltages stored in respective first and second capacitors 802, 806 may be read out by turning off transistor 810 and appropriately setting the sample reset indicator $SH_{rst}$ and the sample signal indicator $SH_{sig}$. The third reset voltage $V_{rst3}$ stored in first capacitor 802 may be read by setting the sample reset indicator $SH_{rst}$ to represent a logical "1" and the sample signal indicator $SH_{sig}$ to represent a logical "0". The third signal voltage $V_{sig3}$ stored in second capacitor 806 may be read by setting the sample reset indicator $SH_{rst}$ to represent a logical "0" and the sample signal indicator $SH_{sig}$ to represent a logical "1".

Figure 9:
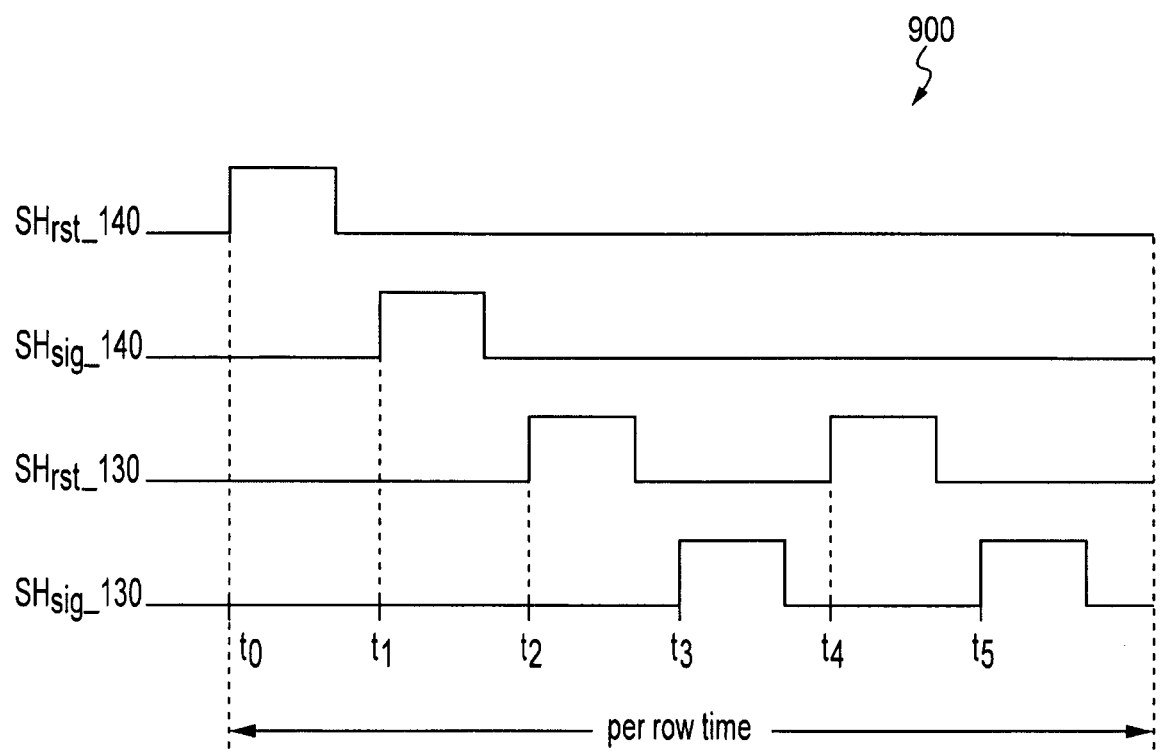
FIG. 9 is an example timing diagram in accordance with an embodiment disclosed herein.

FIG. 9 is an example timing diagram 900 in accordance with an embodiment disclosed herein. Timing diagram 900 will be described with continued reference to sensor readout module 114 and components thereof described above in reference to FIGS. 1, 2, and 6-8, though timing diagram 900 is not limited to those embodiments. Timing diagram 900 is provided for illustrative purposes and is not necessarily drawn to scale.

Referring to FIG. 9, sample reset indicator $SH_{rst\_}140$ indicates whether a pixel reset voltage is selected for sampling in second S/H circuit 140. Sample signal indicator $SH_{sig\_}140$ indicates whether a pixel signal voltage is selected for sampling in second S/H circuit 140. Sample reset indicator $SH_{rst\_}130$ indicates whether a pixel reset voltage is selected for sampling in first S/H circuit 130. Sample signal indicator $SH_{sig\_}130$ indicates whether a pixel signal voltage is selected for sampling in first S/H circuit 130. In FIG. 9, a logical "1" indicates that a respective voltage is selected, and a logical "0" indicates that the respective voltage is not selected, though the embodiments disclosed herein are not limited in this respect.

At time $t_0$, sample reset indicator $SH_{rst\_}140$ is set to a logical "1", enabling a first pixel reset voltage $V_{rst1}$ corresponding to a first integration time to be selected for sampling in second S/H circuit 140. After the first pixel reset voltage $V_{rst1}$ is sampled, sample reset indicator $SH_{rst\_}140$ is set to a logical "0", indicating that the first pixel reset voltage $V_{rst1}$ is no longer selected for sampling.

At time $t_1$, sample signal indicator $SH_{sig\_}140$ is set to a logical "1", enabling a first pixel signal voltage $V_{sig1}$ corresponding to the first integration time to be selected for sampling in second S/H circuit 140. After the first pixel signal voltage $V_{sig1}$ is sampled, sample signal indicator $SH_{sig\_}140$ is set to a logical "0", indicating that the first pixel signal voltage $V_{sig1}$ is no longer selected for sampling.

At time $t_2$, sample reset indicator $SH_{rst\_}130$ is set to a logical "1", enabling a second pixel reset voltage $V_{rst2}$ corresponding to a second integration time that is less than the first integration time to be selected for sampling in first S/H circuit 130. After the second pixel reset voltage $V_{rst2}$ is sampled, sample reset indicator $SH_{rst\_}130$ is set to a logical "0", indicating that the second pixel reset voltage $V_{rst2}$ is no longer selected for sampling.

At time $t_3$, sample signal indicator $SH_{sig\_}130$ is set to a logical "1", enabling a second pixel signal voltage $V_{sig2}$ corresponding to the second integration time to be selected for sampling in first S/H circuit 130. After the second pixel signal voltage $V_{sig2}$ is sampled, sample signal indicator $SH_{sig\_}130$ is set to a logical "0", indicating that the second pixel signal voltage $V_{sig2}$ is no longer selected for sampling.

At time $t_4$, sample reset indicator $SH_{rst\_}130$ is set to a logical "1" again to indicate that a third pixel reset voltage $V_{rst3}$ corresponding to a third integration time that is less than the second integration time is selected for sampling in first S/H circuit 130. If the saturation indicator SAT represents a logical "1", the third pixel reset voltage $V_{rst3}$ is sampled in first S/H circuit 130. On the other hand, if the saturation indicator SAT represents a logical "0", the third pixel reset voltage $V_{rst3}$ is not sampled. The sample reset indicator $SH_{rst\_}130$ is then set to a logical "0" again, indicating that the third pixel reset voltage $V_{rst3}$ is no longer selected for sampling.

At time $t_5$, sample signal indicator $SH_{sig\_}130$ is set to a logical "1" again to indicate that a third pixel signal voltage $V_{sig3}$ corresponding to the third integration time is selected for sampling in first S/H circuit 130. If the saturation indicator SAT represents a logical "1", the third pixel signal voltage $V_{sig3}$ is sampled in first S/H circuit 130. On the other hand, if the saturation indicator SAT represents a logical "0", the third pixel signal voltage $V_{sig3}$ is not sampled. The sample signal indicator $SH_{sig\_}$ 130 is then set to a logical "0" again, indicating that the third pixel signal voltage $V_{sig3}$ is no longer selected for sampling.

The time necessary to sample a row of pixels in a conventional single exposure system is referred to as the "per row time." FIG. 9 illustrates that three pixel reset voltages and three pixel signal voltages may be sampled for each pixel in a row of pixels within a single per row time, though the embodiments disclosed herein are not limited in this respect. Persons skilled in the relevant art(s) will recognize that the embodiments disclosed herein may be utilized to sample any number of pixel reset voltages and pixel signal voltages for each pixel in a row of pixels within a single per row time. For instance, n pixel reset voltages and n pixel signal voltages may be sampled for each pixel in a row of pixels within a single row time, wherein n is an integer greater than two.

The sampling order depicted in FIG. 9 is provided for illustrative purposes and is not intended to be limiting. Persons skilled in the relevant art(s) will recognize that pixel reset and signal voltages corresponding with different integration times may be sampled in any order.

Figure 10:
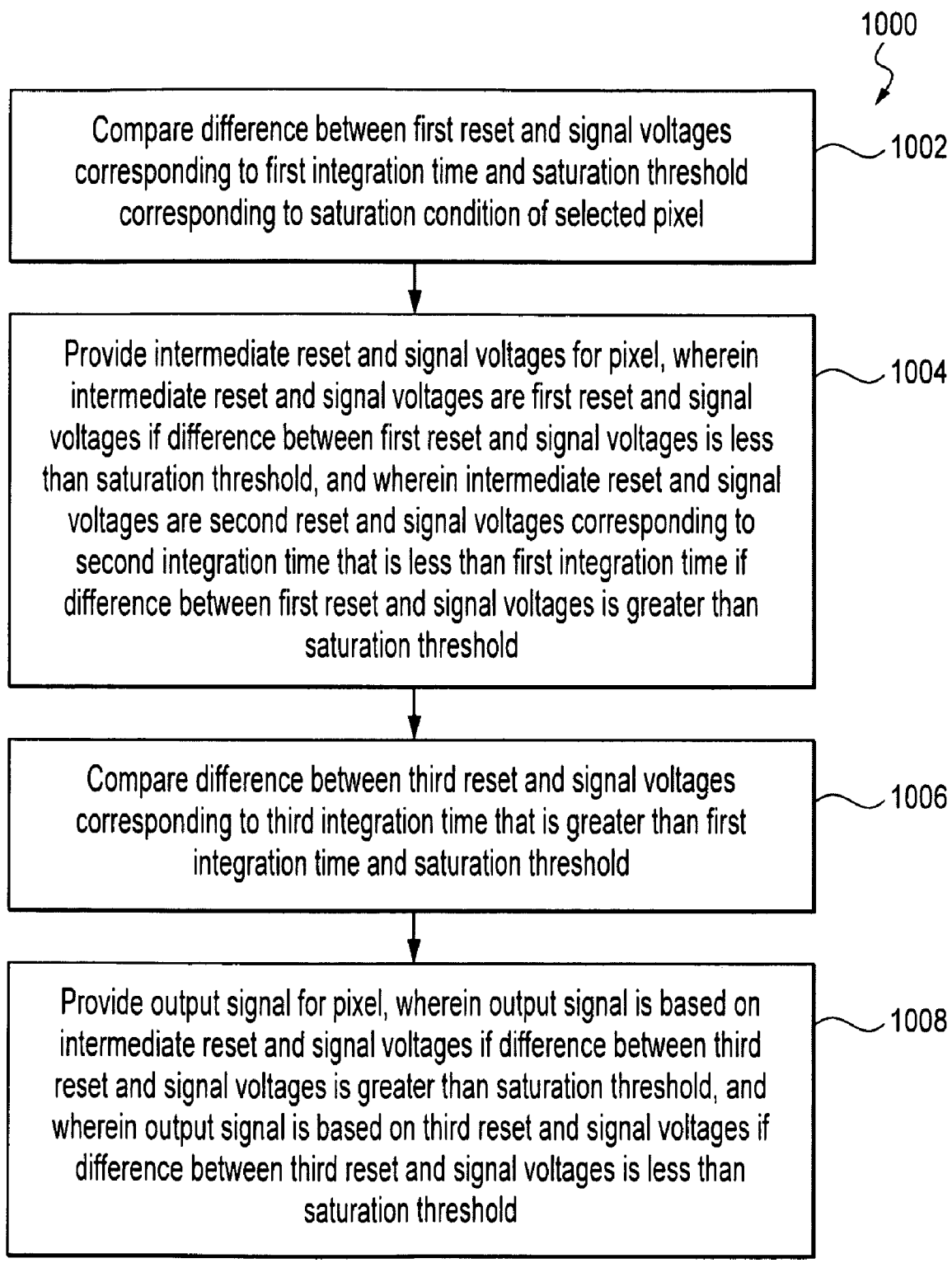
FIGS. 10-12 are flowcharts of sensor readout methods in accordance with embodiments disclosed herein.
Figure 11:
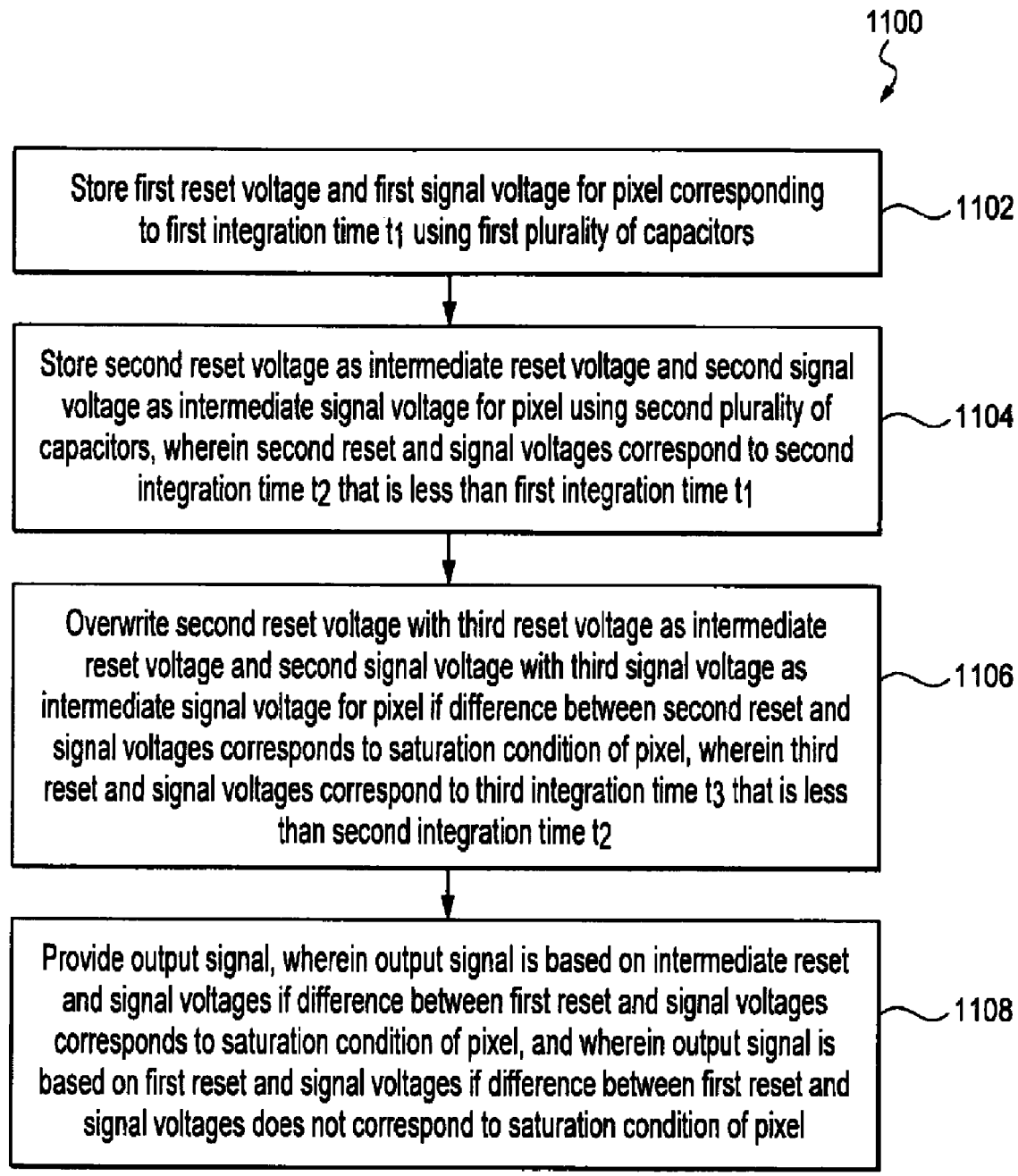
Figure 12:
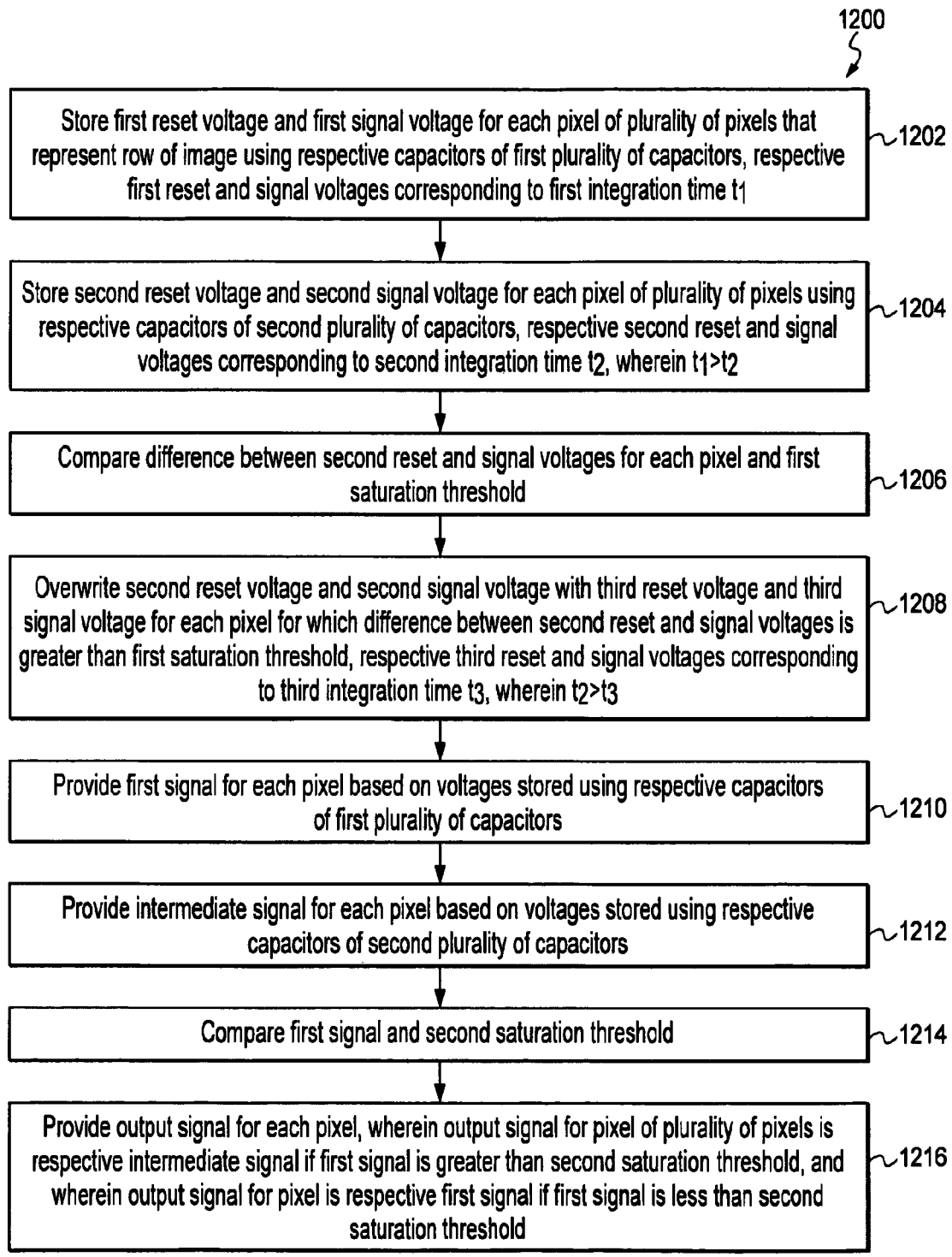

FIGS. 10-12 are flowcharts of sensor readout methods in accordance with embodiments disclosed herein. The embodiments described herein, however, are not limited to the descriptions provided by the flowcharts. Rather, it will be apparent to persons skilled in the relevant art(s) from the teachings provided herein that other functional flows are within the scope and spirit of the embodiments.

Methods 1000, 1100, and 1200 will be described with continued reference to sensor readout module 114 and components thereof described above in reference to FIGS. 1, 2, and 6-8, though the methods are not limited to those embodiments.

Referring now to FIG. 10, a difference between first reset and signal voltages corresponding to a first integration time and a saturation threshold corresponding to a saturation condition of the selected pixel are compared at block 1002. For example, gain block 616 or differential comparator 718 may compare the difference between the first reset and signal voltages and the saturation threshold.

Intermediate reset and signal voltages for the pixel are provided at block 1004. The intermediate reset and signal voltages are the first reset and signal voltages if the difference between the first reset and signal voltages is less than the saturation threshold. The intermediate reset and signal voltages are second reset and signal voltages corresponding to a second integration time if the difference between the first reset and signal voltages is greater than the saturation threshold. The second integration time is less than the first integration time. For instance, first S/H circuit 130, sampling module 600, or sampling module 700 may provide the intermediate reset and signal voltages.

At block 1006, a difference between third reset and signal voltages corresponding to a third integration time and the saturation threshold are compared. The third integration time is greater than the first integration time. For example, third multiplexer 222 may compare the difference between the third reset and signal voltages and the saturation threshold.

An output signal for the pixel is provided at block 1008. The output signal is based on the intermediate reset and signal voltages if the difference between the third reset and signal voltages is greater than the saturation threshold. The output signal is based on the third reset and signal voltages if the difference between the third reset and signal voltages is less than the saturation threshold. For instance, third multiplexer 222 may provide the output signal.

In FIG. 11, a first reset voltage and a first signal voltage for a pixel corresponding to a first integration time $t_1$ is stored using a first plurality of capacitors at block 1102. For example, first capacitor 802 and second capacitor 806 may store the first reset voltage and the first signal voltage, respectively.

A second reset voltage is stored as an intermediate reset voltage and a second signal voltage is stored as an intermediate signal voltage for the pixel using a second plurality of capacitors at block 1104. The second reset and signal voltages correspond to a second integration time $t_2$ that is less than the first integration time $t_1$. For instance, first capacitor 602 and second capacitor 606 may store the second reset voltage and the second signal voltage, respectively.

At block 1106, the second reset voltage is overwritten with a third reset voltage as the intermediate reset voltage and the second signal voltage is overwritten with a third signal voltage as the intermediate signal voltage for the pixel if the difference between the second reset and signal voltages corresponds to a saturation condition of the pixel. The third reset and signal voltages correspond to a third integration time $t_3$ that is less than the second integration time $t_2$. For example, first and second AND gates 612, 614 may control respective first and second switches 604, 608 to overwrite the second reset and signal voltages with respective third reset and signal voltages.

An output signal is provided at block 1108. The output signal is based on the intermediate reset and signal voltages if the difference between the first reset and signal voltages corresponds to the saturation condition of the pixel. The output signal is based on the first reset and signal voltages if the difference between the first reset and signal voltages does not correspond to the saturation condition of the pixel. For instance, third multiplexer 222 may provide the output signal.

FIG. 12 illustrates that the sensor readout techniques described herein may be applied to any number of pixels. For example, the embodiment of FIG. 12 is described with reference to a plurality of pixels that represent a row of an image. In FIG. 12, a first reset voltage and a first signal voltage for each pixel of the plurality of pixels are stored using respective capacitors of a first plurality of capacitors at block 1202. The plurality of pixels represent a row of an image. The respective first reset and signal voltages correspond to a first integration time $t_1$. For example, first capacitor 802 and second capacitor 806 may store the first reset voltage and the first signal voltage, respectively, for each pixel. First and second capacitors 802, 806 each may include a plurality of capacitors. For instance, each of the plurality of capacitors in first capacitor 802 may store a first reset voltage for a respective pixel of the plurality of pixels. Each of the plurality of capacitors in second capacitor 806 may store a first signal voltage for a respective pixel of the plurality of pixels.

At block 1204, a second reset voltage and a second signal voltage for each pixel of the plurality of pixels are stored using respective capacitors of a second plurality of capacitors. The respective second reset and signal voltages correspond to a second integration time $t_2$, wherein $t_1 > t_2$. For instance, first capacitor 602 and second capacitor 606 may store the second reset voltage and the second signal voltage, respectively, for each pixel. First and second capacitors 602, 606 each may include a plurality of capacitors. For instance, each of the plurality of capacitors in first capacitor 602 may store a second reset voltage for a respective pixel of the plurality of pixels. Each of the plurality of capacitors in second capacitor 606 may store a second signal voltage for a respective pixel of the plurality of pixels.

A difference between the second reset and signal voltages for each pixel and a first saturation threshold are compared at block 1206. For example, gain block 616 may compare the difference between the second reset and signal voltages for each pixel and the first saturation threshold. Gain block 616 may include a plurality of gain blocks. For instance, each of the gain blocks in gain block 616 may compare the difference between the second reset and signal voltages of a respective pixel of the plurality of pixels and the first saturation threshold.

At block 1208, the second reset voltage and the second signal voltage are overwritten with a third reset voltage and a third signal voltage for each pixel for which the difference between the second reset and signal voltages is greater than the first saturation threshold. The respective third reset and signal voltages correspond to a third integration time $t_3$, wherein $t_2 > t_3$. For example, first and second AND gates 612, 614 may control respective first and second switches 604, 608 to overwrite the second reset and signal voltages with respective third reset and signal voltages for each pixel. First and second AND gates 612, 614 each may include a plurality of AND gates. First and second switches 604, 608 each may include a plurality of switches. For instance, each of the AND gates in first AND gate 612 may control a respective switch in first switch 604 to overwrite the second reset voltage of a respective pixel of the plurality of pixels with the third reset voltage of the respective pixel. Each of the AND gates in second AND gate 614 may control a respective switch in second switch 608 to overwrite the second signal voltage of a respective pixel of the plurality of pixels with the third signal voltage of the respective pixel.

A first signal is provided for each pixel based on the voltages stored using the respective capacitors of the first plurality of capacitors at block 1210. For example, second low gain module 212, second high gain module 214, second multiplexer 216, or second ADC 218 may provide the first signal for each pixel. Each of these elements 212, 214, 216, 218 may include a plurality of elements corresponding to respective pixels of the plurality of pixels. Accordingly, each of the plurality of elements may provide a first signal for a respective pixel.

At block 1212, an intermediate signal is provided for each pixel based on the voltages stored using the respective capacitors of the second plurality of capacitors. For example, first low gain module 202, first high gain module 204, first multiplexer 206, or first ADC 208 may provide the intermediate signal for each pixel. Each of these elements 202, 204, 206, 208 may include a plurality of elements corresponding to respective pixels of the plurality of pixels. Accordingly, each of the plurality of elements may provide an intermediate signal for a respective pixel.

The first signal and a second saturation threshold are compared at block 1214. For instance, third multiplexer 222 may compare the first signal and the second saturation threshold. Third multiplexer 222 may include a plurality of multiplexers, each of which may compare a first signal for a respective pixel of the plurality of pixels and the second saturation threshold.

At block 1216, an output signal is provided for each pixel. The output signal for a pixel of the plurality of pixels is the respective intermediate signal if the first signal is greater than the second saturation threshold. The output signal for the pixel is the respective first signal if the first signal is less than the second saturation threshold. For example, third multiplexer 222 may provide the output signal. If third multiplexer includes a plurality of multiplexers, each of the multiplexers may provide an output signal for a respective pixel of the plurality of pixels.

Figure 13:
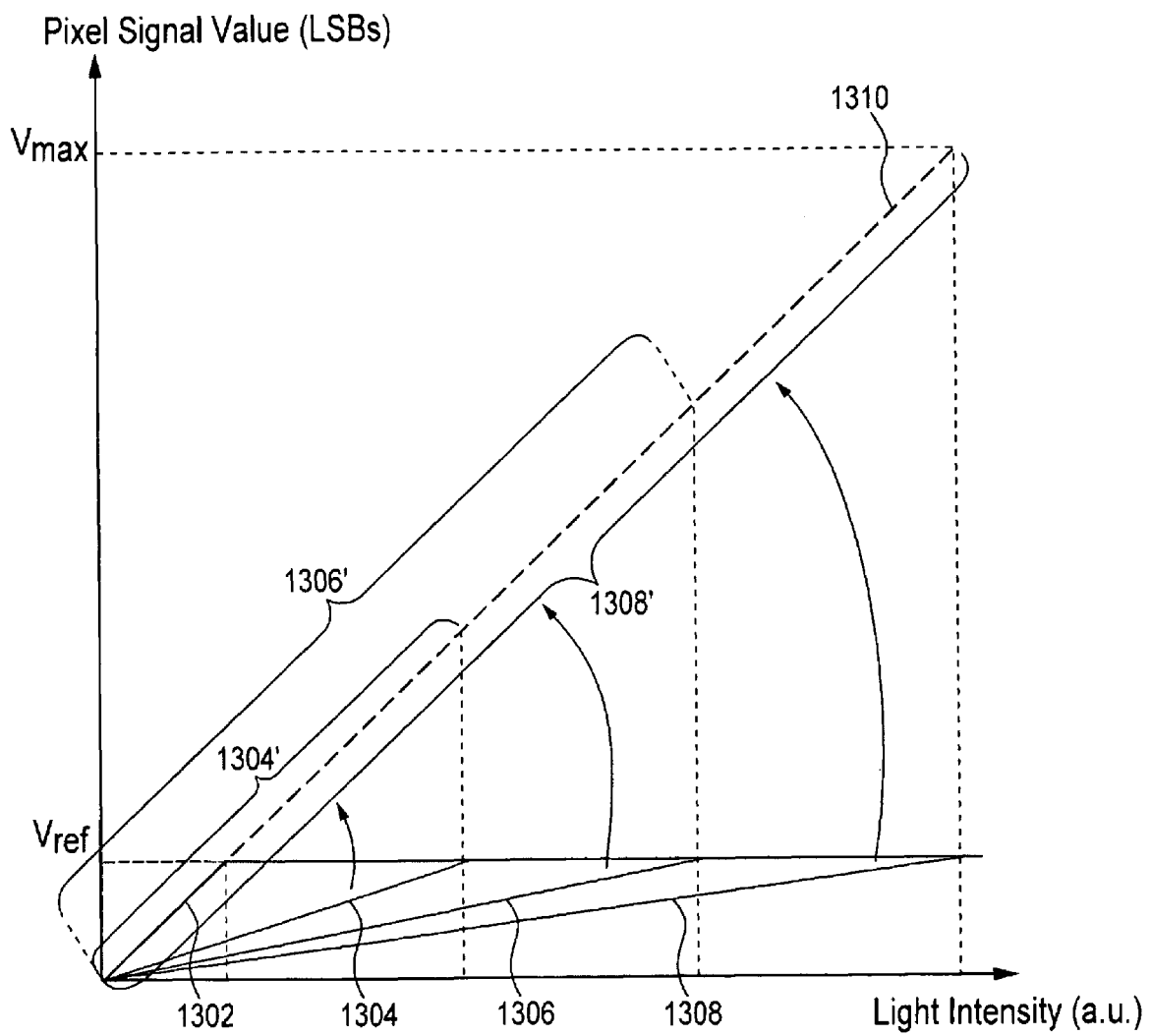
FIG. 13 illustrates the normalization of pixel signal values in accordance with an embodiment disclosed herein.

FIG. 13 illustrates the normalization of pixel signal values in accordance with an embodiment disclosed herein. Pixel signals corresponding to different integration times exhibit different response curves, meaning that the relationships between the signal values for the pixels and the respective associated light intensities differ. Moreover, pixel signals that are multiplied by different gains exhibit different response curves. For example, a first pixel signal may be multiplied by a first gain to provide an amplified pixel signal that is within an operating range of an ADC, while another pixel signal may be multiplied by a different gain for the same purpose. Normalization adjusts the pixel signal values to achieve a linear response curve for the pixels as depicted by line 1310. The normalization operations described below are indicative of those performed by normalization module 122 of FIG. 1.

In the following discussion, reference will be made to short, medium, and long integration times. It should be recognized that these terms are relative and are not intended to be absolute. For purposes of illustration, the long integration time is four times the medium integration time, and the medium integration time is four times the short integration time. Persons skilled in the relevant art(s) will recognize that the short, medium, and long integration times can be any respective values, so long as the short integration time is less than the medium integration time and the medium integration time is less than the long integration time.

Reference will also be made to high and low gains. It should be recognized that these terms are also relative. For purposes of illustration, the low gain is a unity gain. In other words, the low gain has a value of one. The high gain is four times the low gain in this example illustration. The low and high gains can be any respective values, so long as the low gain is less than the high gain.

Referring to FIG. 13, $V_{max}$ represents a maximum pixel signal voltage in imager 100, and $V_{ref}$ represents the upper limit of the operating voltage range of first and second ADCs 208, 218 discussed above with respect to FIG. 2. Pixel response curve 1302 corresponds to a long integration time and a high gain. As shown in FIG. 13, pixel response curve 1302 lies along linear response curve 1310. Thus, the pixel signal values corresponding to pixel response curve 1302 need not be normalized, though these pixel signal values may be multiplied by one. Pixel response curve 1302 will therefore serve as a reference for the normalization calculations described below with respect to the normalization of pixel response curves 1304, 1306, and 1308.

Pixel response curve 1304 corresponds to the long integration time and a low gain. The low gain is one-quarter of the high gain. Thus, the pixel signal values corresponding to pixel response curve 1304 are multiplied by four to provide normalized response curve 1304', which lies along linear response curve 1310. Multiplying the pixel signal values corresponding to pixel response curve 1304 by four therefore normalizes those values. This may be achieved by adding two least-significant-bits (LSBs) (i.e., "00") to the pixel signal values.

Pixel response curve 1306 corresponds to a medium integration time and a low gain. The low gain is one-quarter of the high gain. Moreover, the medium integration time is one-quarter of the long integration time. Thus, the pixel signal values corresponding to pixel response curve 1306 are multiplied by sixteen (i.e., 4*4=16) to provide normalized response curve 1306', which lies along linear response curve 1310. Multiplying the pixel signal values corresponding to pixel response curve 1306 by sixteen therefore normalizes those values. This may be achieved by adding four LSBs (i.e., "0000") to the pixel signal values.

Pixel response curve 1308 corresponds to a short integration time and a low gain. The low gain is one-quarter of the high gain. Moreover, the short integration time is one-sixteenth of the long integration time. Thus, the pixel signal values corresponding to pixel response curve 1308 are multiplied by sixty-four (i.e., 4*16=64) to provide normalized response curve 1308', which lies along linear response curve 1310. Multiplying the pixel signal values corresponding to pixel response curve 1308 by sixty-four therefore normalizes those values. This may be achieved by adding six LSBs (i.e., "000000") to the pixel signal values.

Three different integration times are described with reference to FIG. 13, though persons skilled in the relevant art(s) will recognize that the techniques described herein are applicable to any number of different integration times.

The embodiments described herein may improve the accuracy of a reproduced image by enabling the selection of a reset voltage and a signal voltage for a pixel from a plurality of reset and signal voltages corresponding to respective different integration times. These embodiments may reduce frame rate, power consumption, cost, etc., as compared to conventional sensor readout techniques. For instance, the embodiments described herein may be characterized by a relatively low horizontal blanking time because only one horizontal scanning/ADC phase is needed per row of pixels to cover three different exposures. The embodiments may be characterized by relatively fewer components. For instance, two sets of sampling capacitors and analog-to-digital converters (ADCs) are capable of reading out three exposures. The embodiments are suitable for mobile applications. The embodiments may be characterized by a relatively small die area. For instance, the embodiments may enable small pixels for a relatively low cost, as compared to conventional sensor readout techniques. The embodiments may enable reuse of a proven mobile sensor platform with serial readout with only one change, namely sampling pitch is single pixel (i.e., not double pitch, as in conventional top/bottom readout configurations). The embodiments may include automatic per-pixel control of analog signal chain (ASC) gain for increased low-light sensitivity. The embodiments may be adapted to a column parallel architecture.

Figure 14:
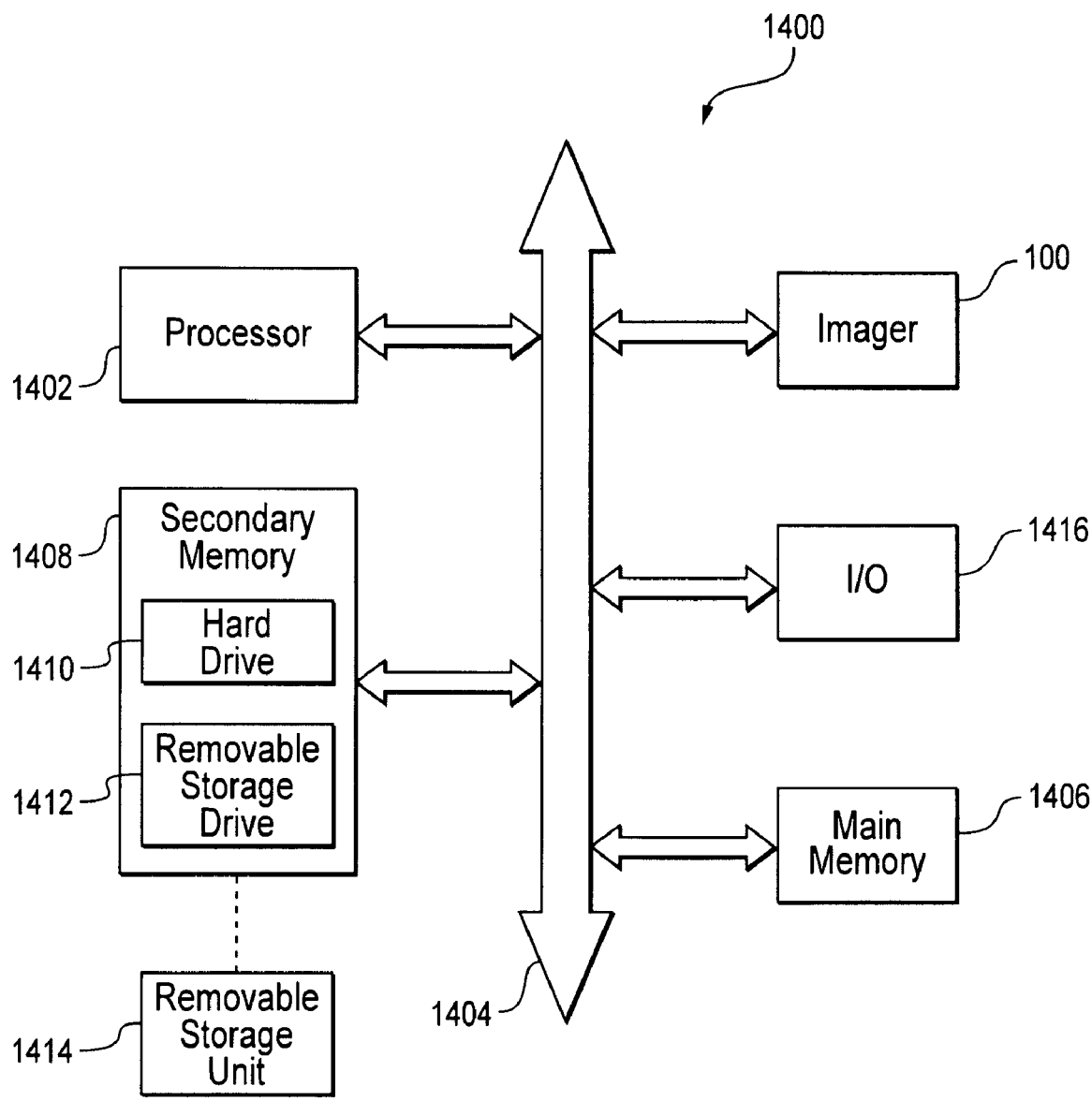
FIG. 14 is an example processor system that includes an imager in accordance with an embodiment disclosed herein.

FIG. 14 is a block diagram of an example processor system 1400 that includes an imager, such as imager 100 of FIG. 1, in accordance with an embodiment disclosed herein. Processor system 1400 will be described with reference to imager 100 for convenience. Processor system 1400 is capable of performing the multiple exposure techniques described herein. For example, the techniques may be performed exclusively by imager 100 or may be shared among imager 100 and other components of processor system 1400. Without being limiting, processor system 1400 may include a computer system, camera system, scanner, machine vision, vehicle navigation, video phone, surveillance system, auto focus system, star tracker system, motion detection system, image stabilization system, data compression system, etc.

Referring to FIG. 14, imager 100 provides an image from a pixel array. Processor system 1400 includes one or more processors, such as processor 1402, which are capable of processing the image. Processor 1402 may be any type of processor, including but not limited to a special purpose or a general purpose digital signal processor. Processor system 1400 also includes a main memory 1406, preferably random access memory (RAM), and may also include a secondary memory 1408. Secondary memory 1408 may include, for example, a hard disk drive 1410 and/or a removable storage drive 1412, representing a floppy disk drive, a magnetic tape drive, an optical disk drive, etc. Removable storage drive 1412 reads from and/or writes to a removable storage unit 1414 in a well known manner. Removable storage unit 1414 represents a floppy disk, magnetic tape, optical disk, etc. As will be appreciated, removable storage unit 1414 includes a computer usable storage medium having stored therein computer software and/or data.

Communication infrastructure 1404 (e.g., a bus or a network) facilitates communication among the components of processor system 1400. For example, imager 100, input/output (I/O) device 1416, main memory 1406, and/or secondary memory 1408 may communicate with processor 1402 or with each other via communication infrastructure 1404.

Processor system 1400 may further include a display interface, which forwards graphics, text, and/or other data from communication infrastructure 1404 (or from a frame buffer not shown) for display on a display unit.

According to the embodiments described herein, imager 100 may be combined with a processor, such as a CPU, digital signal processor, or microprocessor, with or without memory storage on a single integrated circuit or on a different chip than the processor.

It will be recognized by persons skilled in the relevant art(s) that the multiple exposure techniques described herein may be implemented as control logic in hardware, firmware, or software or any combination thereof.

Figure 15:
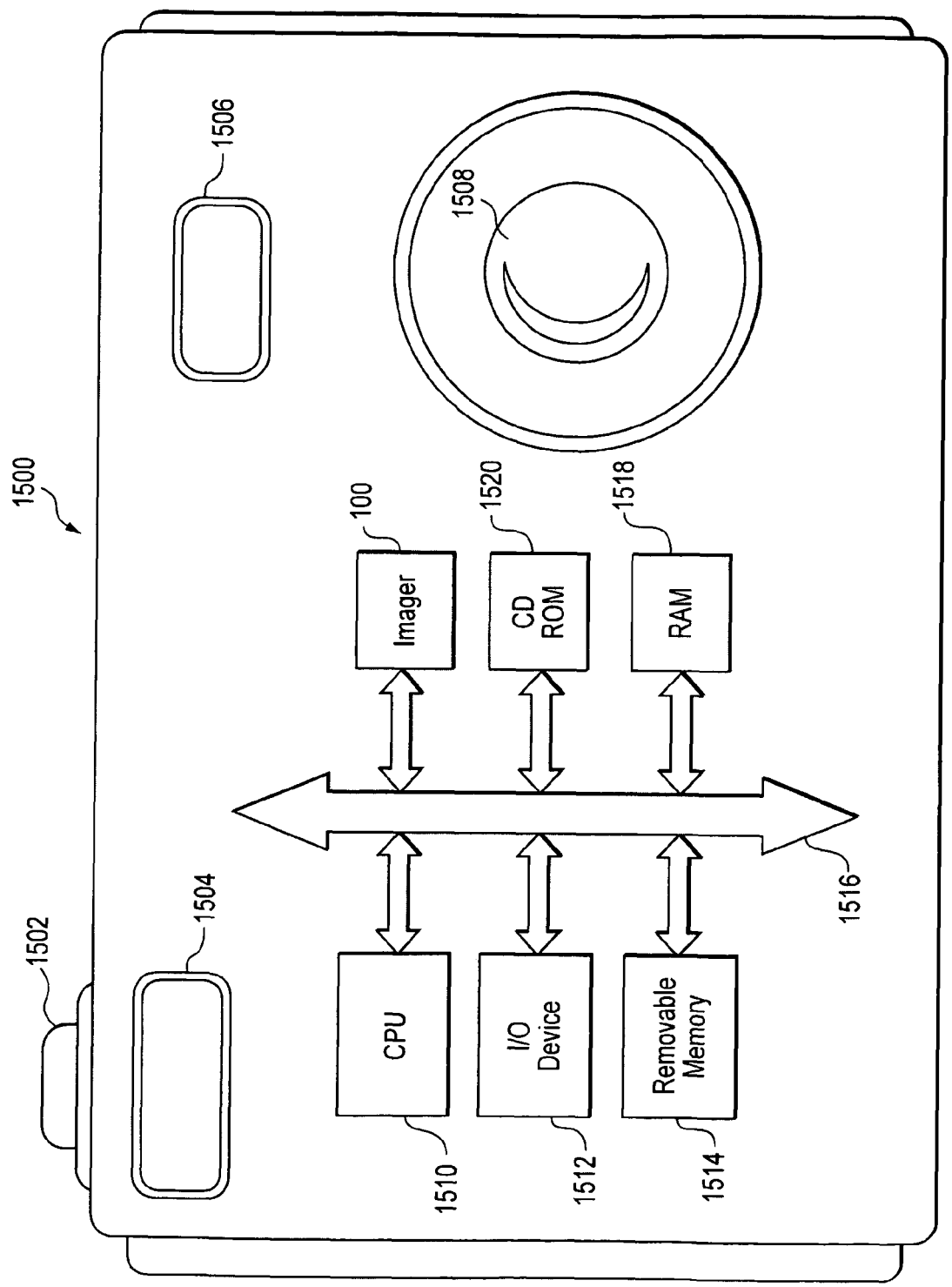
FIG. 15 is a block diagram of an image processing system, incorporating an imager in accordance with the method and apparatus embodiments described herein.

FIG. 15 is a block diagram of an image processing system, e.g., a camera system, 1500 incorporating an imager 100 in accordance with the method and apparatus embodiments described herein. In FIG. 15, imager 100 provides an image output signal as described above. A camera system 1500 generally includes a shutter release button 1502, a view finder 1504, a flash 1506 and a lens system 1508. A camera system 1500 generally also includes a camera control central processing unit (CPU) 1510, for example, a microprocessor, that communicates with one or more input/output (I/O) devices 1512 over a bus 1516. CPU 1510 also exchanges data with random access memory (RAM) 1518 over bus 1516, typically through a memory controller. A camera system may also include peripheral devices such as a removable flash memory 1514, which also communicates with CPU 1510 over bus 1516. A camera system may also include a read only memory (ROM) such as a CD ROM 1520, which CPU 1510 may read over bus 1516.

Example embodiments of methods, systems, and components thereof have been described herein. As noted elsewhere, these example embodiments have been described for illustrative purposes only, and are not limiting. Other embodiments and modifications, though presently unforeseeable, of the embodiments described herein are possible and are covered by the invention. Such other embodiments and modifications will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed as new and desired to be protected by Letters Patent of the United States is:

1. A method comprising:
    storing a first reset voltage as an intermediate reset voltage and a first signal voltage as an intermediate signal voltage for a pixel corresponding to a first integration time $t_1$ using a plurality of storage elements;

overwriting the first reset voltage with a second reset voltage as the intermediate reset voltage and the first signal voltage with a second signal voltage as the intermediate signal voltage for the pixel if the difference between the first reset and signal voltages corresponds to a saturation condition of the pixel, wherein the second reset and signal voltages correspond to a second integration time $t_2$ that is less than the first integration time $t_1$;

amplifying the intermediate reset and signal voltages using a first gain to provide a low gain intermediate differential signal and using a second gain that is greater than the first gain to provide a high gain intermediate differential signal; and providing a qualifying intermediate signal, wherein the qualifying intermediate signal is the high gain intermediate differential signal if the high gain intermediate differential signal is less than a reference threshold, and wherein the qualifying intermediate signal is the low gain intermediate differential signal if the high gain intermediate differential signal is greater than the reference threshold.

2. An apparatus comprising:

a plurality of storage elements to store first respective reset and signal voltages as intermediate reset and signal voltages, the first reset and signal voltages corresponding to a first integration time for a pixel;

a circuit for providing an overwrite indication signal having a first value if the difference between the first reset and signal voltages corresponds to a saturation condition of the pixel and a second value if the difference between the first reset and signal voltages does not correspond to the saturation condition; and a circuit for overwriting the first reset and signal voltages with second reset and signal voltages as the intermediate reset and signal voltages if the overwrite indication signal has the first value, the second reset and signal voltages corresponding to a second integration time for the pixel that is less than the first integration time, wherein the circuit for providing the output signal comprises:
- a low gain module coupled to the plurality of storage elements to amplify the intermediate reset and signal voltages using a first gain to provide a low gain intermediate differential signal;
- a high gain module coupled to the plurality of storage elements to amplify the intermediate reset and signal voltages using a second gain that is greater than the first gain to provide a high gain intermediate differential signal; and
- a multiplexer to provide a qualifying intermediate signal, wherein the qualifying intermediate signal is the low gain intermediate differential signal if the high gain intermediate differential signal is greater than a reference threshold, and wherein the qualifying intermediate signal is the high gain intermediate differential signal if the high gain intermediate differential signal is less than the reference threshold.

3. The apparatus of claim 2, wherein the first gain is approximately one, and wherein the second gain is approximately a multiple factor of two.

4. An imager comprising:

a pixel array including a pixel that provides electrons based on photons incident on the pixel; and a module coupled to the pixel array, said module comprising:
- a plurality of storage elements to store first respective reset and signal voltages as intermediate reset and signal voltages, the first reset and signal voltages corresponding to a first integration time for a pixel;
- a comparator to provide an overwrite indication signal having a first value if the difference between the first reset and signal voltages corresponds to a saturation condition of the pixel and a second value if the difference between the first reset and signal voltages does not correspond to the saturation condition;
- logic to overwrite the first reset and signal voltages with second reset and signal voltages as the intermediate reset and signal voltages if the overwrite indication signal has the first value, the second reset and signal voltages corresponding to a second integration time for the pixel that is less than the first integration time;
- a low gain module coupled to the plurality of storage elements to amplify the intermediate reset and signal voltages using a first gain to provide a low gain intermediate differential signal;
- a high gain module coupled to the plurality of storage elements to amplify the intermediate reset and signal voltages using a second gain that is greater than the first gain to provide a high gain intermediate differential signal; and
- a multiplexer to provide a qualifying intermediate signal, wherein the qualifying intermediate signal is the low gain intermediate differential signal if the high gain intermediate differential signal is greater than a reference threshold, and wherein the qualifying intermediate signal is the high gain intermediate differential signal if the high gain intermediate differential signal is less than the reference threshold.

5. A method comprising:

comparing a difference between first reset and signal voltages corresponding to a first integration time for a pixel and a saturation threshold corresponding to a saturation condition of the pixel;

providing intermediate reset and signal voltages for the pixel, wherein the intermediate reset and signal voltages are the first reset and signal voltages if the difference between the first reset and signal voltages is less than the saturation threshold, and wherein the intermediate reset and signal voltages are second reset and signal voltages corresponding to a second integration time for the pixel that is less than the first integration time if the difference between the first reset and signal voltages is greater than the saturation threshold;

comparing a difference between third reset and signal voltages corresponding to a third integration time for the pixel that is greater than the first integration time and the saturation threshold; and providing an output signal for the pixel, wherein the output signal is based on the intermediate reset and signal voltages if the difference between the third reset and signal voltages is greater than the saturation threshold, and wherein the output signal is based on the third reset and signal voltages if the difference between the third reset and signal voltages is less than the saturation threshold.

6. The method of claim 5, further comprising:

amplifying the intermediate reset and signal voltages using a first gain to provide a low gain intermediate differential signal;

amplifying the intermediate reset and signal voltages using a second gain that is greater than the first gain to provide a high gain intermediate differential signal;

comparing the high gain intermediate differential signal and a reference threshold;

providing a qualifying intermediate signal, wherein the qualifying intermediate signal is the high gain intermediate differential signal if the high gain intermediate differential signal is less than the reference threshold, and wherein the qualifying intermediate signal is the low gain intermediate differential signal if the high gain intermediate differential signal is greater than the reference threshold;

amplifying the third reset and signal voltages using the first gain to provide a low gain third differential signal;

amplifying the third reset and signal voltages using the second gain to provide a high gain third differential signal;

comparing the high gain third differential signal and the reference threshold; and providing a qualifying third signal, wherein the qualifying third signal is the high gain third differential signal if the high gain third differential signal is less than the reference threshold, and wherein the qualifying third signal is the low gain third differential signal if the high gain third differential signal is greater than the reference threshold;

wherein the output signal is based on the qualifying intermediate signal if the difference between the third reset and signal voltages is greater than the saturation threshold, and wherein the output signal is based on the qualifying third signal if the difference between the third reset and signal voltages is less than the saturation threshold.

7. The method of claim 6, wherein the first gain is approximately one.

8. The method of claim 6, wherein the second gain is approximately a multiple factor of two.

9. The method of claim 5, further comprising:
resetting a photosensor at a row N of a pixel array in response to a first pointer being aligned with the row N and reading the first reset and signal voltages using a second pointer aligned with the row N to define the first integration time;
resetting the photosensor in response to the second pointer still being aligned with the row N and reading the second reset and signal voltages using the second pointer aligned with the row N to define the second integration time; and
resetting the photosensor in response to the second pointer still being aligned with the row N and reading the third reset and signal voltages using the first pointer aligned with the row N to define the third integration time.

10. The method of claim 9, wherein reading the third reset and signal voltages includes pausing to define the third integration time to be greater than a time necessary to read out all rows of a pixel array in which the pixel is included.

11. The method of claim 5, further comprising:
reading the third reset and signal voltages corresponding to the third integration time from the pixel in a row N of a pixel array in response to a first pointer being aligned with the row N;
resetting a photosensor of the pixel in response to the first pointer still being aligned with the row N and reading the first reset and signal voltages from the pixel using a second pointer aligned with the row N to define the first integration time; and
resetting the photosensor in response to the second pointer still being aligned with the row N and reading the second reset and signal voltages from the pixel using the second pointer aligned with the row N to define the second integration time.

12. The method of claim 5, further comprising:
resetting a photosensor at a row N of a pixel array in response to a first pointer being aligned with the row N and reading the first reset and signal voltages using a second pointer aligned with the row N to define the first integration time;
resetting the photosensor in response to the second pointer still being aligned with the row N and reading the third reset and signal voltages using the first pointer aligned with the row N to define the third integration time; and
resetting the photosensor in response to the first pointer still being aligned with the row N and reading the second reset and signal voltages using the first pointer aligned with the row N to define the second integration time.

13. The method of claim 12, wherein reading the third reset and signal voltages includes pausing to define the third integration time to be greater than a time necessary to read out all rows of a pixel array in which the pixel is included.

14. A method comprising:
storing a first reset voltage and a first signal voltage for a pixel corresponding to a first integration time $t_1$ using a first plurality of storage elements;
storing a second reset voltage as an intermediate reset voltage and a second signal voltage as an intermediate signal voltage for the pixel using a second plurality of storage elements, wherein the second reset and signal voltages correspond to a second integration time $t_2$ that is less than the first integration time $t_1$;
overwriting the second reset voltage with a third reset voltage as the intermediate reset voltage and the second signal voltage with a third signal voltage as the intermediate signal voltage for the pixel if the difference between the second reset and signal voltages corresponds to a saturation condition of the pixel, wherein the third reset and signal voltages correspond to a third integration time $t_3$ that is less than the second integration time $t_2$; and
providing an output signal, wherein the output signal is based on the intermediate reset and signal voltages if the difference between the first reset and signal voltages corresponds to the saturation condition of the pixel, and wherein the output signal is based on the first reset and signal voltages if the difference between the first reset and signal voltages does not correspond to the saturation condition of the pixel.

15. The method of claim 14, further comprising:
providing an intermediate signal based on a difference between the intermediate reset and signal voltages;
providing a first signal based on a difference between the first reset and signal voltages; and
comparing the first signal and a saturation threshold;
wherein the output signal is the intermediate signal if the first signal is greater than the saturation threshold, and wherein the output signal is the first signal if the first signal is less than the saturation threshold.

16. The method of claim 14, further comprising:
amplifying the intermediate reset and signal voltages using a first gain to provide a low gain intermediate differential signal and using a second gain that is greater than the first gain to provide a high gain intermediate differential signal;
providing a qualifying intermediate signal, wherein the qualifying intermediate signal is the high gain intermediate differential signal if the high gain intermediate differential signal is less than a reference threshold, and wherein the qualifying intermediate signal is the low gain intermediate differential signal if the high gain intermediate differential signal is greater than the reference threshold;

amplifying the first reset and signal voltages using the first gain to provide a low gain first differential signal and using the second gain to provide a high gain first differential signal; and providing a qualifying first signal, wherein the qualifying first signal is the high gain first differential signal if the high gain first differential signal is less than the reference threshold, and wherein the qualifying first signal is the low gain first differential signal if the high gain first differential signal is greater than the reference threshold;

wherein the output signal is based on the qualifying intermediate signal if the difference between the first reset and signal voltages corresponds to the saturation condition of the pixel, and wherein the output signal is based on the qualifying first signal if the difference between the first reset and signal voltages does not correspond to the saturation condition of the pixel.

17. The method of claim 14, further comprising:

simultaneously reading the first reset voltage from a respective storage element of the first plurality of storage elements and the intermediate reset voltage from a respective storage element of the second plurality of storage elements; and simultaneously reading the first signal voltage from a respective storage element of the first plurality of storage elements and the intermediate signal voltage from a respective storage element of the second plurality of storage elements.

18. The method of claim 14, further comprising:

resetting a photosensor at a row N of a pixel array in response to a second pointer being aligned with the row N and reading the first reset and signal voltages using a first pointer aligned with the row N to define the first integration time $t_1$;

resetting the photosensor in response to the first pointer still being aligned with the row N and reading the second reset and signal voltages using the second pointer aligned with the row N to define the second integration time $t_2$; and resetting the photosensor in response to the second pointer still being aligned with the row N and reading the third reset and signal voltages using the second pointer aligned with the row N to define the third integration time $t_3$.

19. The method of claim 18, wherein reading the first reset and signal voltages includes pausing the first pointer to define the first integration time to be greater than a time necessary to read out all rows of a pixel array in which the pixel is included.

20. The method of claim 14, further comprising:

reading the first reset and signal voltages in response to a first pointer being aligned with a row N of a pixel array;

resetting a photosensor in response to the first pointer still being aligned with the row N and reading the second reset and signal voltages using a second pointer aligned with the row N to define the second integration time $t_2$; and resetting the photosensor in response to the second pointer still being aligned with the row N and reading the third reset and signal voltages using the second pointer aligned with the row N to define the third integration time $t_3$.

21. The method of claim 14, further comprising:

resetting a photosensor at a row N of a pixel array in response to a second pointer being aligned with the row N and reading the first reset and signal voltages using a first pointer aligned with the row N to define the first integration time $t_1$;

resetting the photosensor in response to the first pointer still being aligned with the row N and reading the third reset and signal voltages using the first pointer aligned with the row N to define the third integration time $t_3$; and resetting the photosensor in response to the first pointer still being aligned with the row N and reading the second reset and signal voltages using the second pointer aligned with the row N to define the second integration time $t_2$.

22. The method of claim 21, wherein reading the first reset and signal voltages includes pausing the first pointer to define the first integration time to be greater than a time necessary to read out all rows of a pixel array in which the pixel is included.

23. A method comprising:

storing a first reset voltage and a first signal voltage for each pixel of a plurality of pixels that represent a row of an image using respective storage elements of a first plurality of storage elements, the respective first reset and signal voltages corresponding to a first integration time $t_3$ for the pixels;

storing a second reset voltage and a second signal voltage for each pixel of the plurality of pixels using respective storage elements of a second plurality of storage elements, the respective second reset and signal voltages corresponding to a second integration time $t_2$, wherein $t_1 > t_2$;

comparing a difference between the second reset and signal voltages for each pixel and a first saturation threshold;

overwriting the second reset voltage and the second signal voltage with a third reset voltage and a third signal voltage for each pixel for which the difference between the second reset and signal voltages is greater than the first saturation threshold, the respective third reset and signal voltages corresponding to a third integration time $t_3$, wherein $t_2 > t_3$;

providing a first signal for each pixel based on the voltages stored using the respective storage elements of the first plurality of storage elements;

providing an intermediate signal for each pixel based on the voltages stored using the respective storage elements of the second plurality of storage elements;

comparing the first signal and a second saturation threshold; and providing an output signal for each pixel, wherein the output signal for a pixel of the plurality of pixels is the respective intermediate-signal if the first signal is greater than the second saturation threshold, and wherein the output signal for the pixel is the respective first signal if the first signal is less than the second saturation threshold.

24. The method of claim 23, wherein the first saturation threshold and the second saturation threshold are same.

25. The method of claim 23, further comprising:

reading a first storage element of the first plurality of storage elements and a second storage element of the second plurality of storage elements simultaneously, wherein the first and second storage elements store respective reset voltages; and reading a third storage element of the first plurality of storage elements and a fourth storage element of the second plurality of storage elements simultaneously, wherein the third and fourth storage elements store respective signal voltages;

wherein providing the first signal and providing the intermediate signal are performed in response to reading the first, second, third, and fourth storage elements.

26. The method of claim 23, further comprising:
resetting a plurality of photosensors corresponding to the plurality of respective pixels in response to a second pointer pointing to a row of a pixel array that includes the plurality of pixels that represent the row of the image at a first reset time;
reading the first reset and signal voltages for each of the plurality of pixels using a first pointer that points to the row of the pixel array at a first read time subsequent to the first reset time;
resetting the plurality of photosensors in response to the first pointer pointing to the row of the pixel array that includes the plurality of pixels at a second reset time subsequent to the first read time;
reading the second reset and signal voltages for each pixel of the plurality of pixels using the second pointer that points to the row of the pixel array at a second read time subsequent to the second reset time;
resetting the plurality of photosensors in response to the second pointer pointing to the row of the pixel array that includes the plurality of pixels at a third reset time subsequent to the second read time;
reading the third reset and signal voltages for each pixel of the plurality of pixels using the second pointer that points to the row of the pixel array at a third read time subsequent to the third reset time;
wherein the first integration time $t_1$ is a difference between the first reset time and the first read time;
wherein the second integration time $t_2$ is a difference between the second reset time and the second read time; and
wherein the third integration time $t_3$ is a difference between the third reset time and the third read time.

27. The method of claim 23, further comprising:
normalizing the output signals for the respective pixels to compensate for differences associated with the integration times.

28. A sensor readout module comprising:
a sample module including:
    a first plurality of storage elements to store first respective reset and signal voltages as intermediate reset and signal voltages, the first reset and signal voltages corresponding to a first integration time for a pixel,
    a circuit for providing an overwrite indication signal having a first value if the difference between the first reset and signal voltages corresponds to a saturation condition of the pixel and a second value if the difference between the first reset and signal voltages does not correspond to the saturation condition,
    a circuit for overwriting the first reset and signal voltages with second reset and signal voltages as the intermediate reset and signal voltages if the overwrite indication signal has the first value, the second reset and signal voltages corresponding to a second integration time for the pixel that is less than the first integration time, and
    a second plurality of storage elements to store third respective reset and signal voltages corresponding to a third integration time for the pixel, wherein the third integration time is greater than the first integration time; and
a circuit for providing an output signal for the pixel, wherein the output signal is based on the intermediate reset and signal voltages if a difference between the third reset and signal voltages corresponds to the saturation condition, and wherein the output signal is based on the third reset and signal voltages if the difference between the third reset and signal voltages does not correspond to the saturation condition.

29. The sensor readout module of claim 28, wherein the circuit for providing the output signal comprises:
    a first low gain module coupled to the first plurality of storage elements to amplify the intermediate reset and signal voltages using a first gain to provide a low gain intermediate differential signal;
    a first high gain module coupled to the first plurality of storage elements to amplify the intermediate reset and signal voltages using a second gain that is greater than the first gain to provide a high gain intermediate differential signal;
    a first multiplexer to provide a qualifying intermediate signal, wherein the qualifying intermediate signal is the low gain intermediate differential signal if the high gain intermediate differential signal is greater than a reference threshold, and wherein the qualifying intermediate signal is the high gain intermediate differential signal if the high gain intermediate differential signal is less than the reference threshold;
    a second low gain module coupled to the second plurality of storage elements to amplify the third reset and signal voltages using the first gain to provide a low gain third differential signal;
    a second high gain module coupled to the second plurality of storage elements to amplify the third reset and signal voltages using the second gain to provide a high gain third differential signal;
    a second multiplexer to provide a qualifying third signal, wherein the qualifying third signal is the low gain third differential signal if the high gain third differential signal is greater than the reference threshold, and wherein the qualifying third signal is the high gain third differential signal if the high gain third differential signal is less than the reference threshold; and
    a third multiplexer to provide the output signal for the pixel, wherein the output signal is the qualifying intermediate signal if the difference between the third reset and signal voltages corresponds to the saturation condition, and wherein the output signal is the qualifying third signal if the difference between the third reset and signal voltages does not correspond to the saturation condition.

30. The sensor readout module of claim 29, wherein the first gain is approximately one, and wherein the second gain is approximately a multiple factor of two.

31. The sensor readout module of claim 28, wherein the circuit for providing the overwrite indication signal has a single-ended configuration to provide a single-ended overwrite indication signal.

32. The sensor readout module of claim 28, wherein the circuit for providing the overwrite indication signal has a differential configuration to provide a differential overwrite indication signal.

33. The sensor readout module of claim 28, further comprising:
    a normalization module for normalizing the output signal to correspond with a linear response curve.

34. An imager comprising:
a pixel array including a pixel that provides electrons based on photons incident on the pixel; and
a sensor readout module coupled to the pixel array, said sensor readout module comprising:

a sample module including:
  a first plurality of storage elements to store first respective reset and signal voltages as intermediate reset and signal voltages, the first reset and signal voltages corresponding to a first integration time for a pixel,
  a comparator to provide an overwrite indication signal having a first value if the difference between the first reset and signal voltages corresponds to a saturation condition of the pixel and a second value if the difference between the first reset and signal voltages does not correspond to the saturation condition,
  logic to overwrite the first reset and signal voltages with second reset and signal voltages as the intermediate reset and signal voltages if the overwrite indication signal has the first value, the second reset and signal voltages corresponding to a second integration time for the pixel that is less than the first integration time, and
  a second plurality of storage elements to store third respective reset and signal voltages corresponding to a third integration time for the pixel, wherein the third integration time is greater than the first integration time; and
a pre-processing module to provide an output signal for the pixel, wherein the output signal is based on the intermediate reset and signal voltages if a difference between the third reset and signal voltages corresponds to the saturation condition, and wherein the output signal is based on the third reset and signal voltages if the difference between the third reset and signal voltages does not correspond to the saturation condition.

35. The imager of claim 34, wherein the pre-processing module includes:
  a first low gain module coupled to the first plurality of storage elements to amplify the intermediate reset and signal voltages using a first gain to provide a low gain intermediate differential signal;
  a first high gain module coupled to the first plurality of storage elements to amplify the intermediate reset and signal voltages using a second gain that is greater than the first gain to provide a high gain intermediate differential signal;
  a first multiplexer to provide a qualifying intermediate signal, wherein the qualifying intermediate signal is the low gain intermediate differential signal if the high gain intermediate differential signal is greater than a reference threshold, and wherein the qualifying intermediate signal is the high gain intermediate differential signal if the high gain intermediate differential signal is less than the reference threshold;
  a second low gain module coupled to the second plurality of storage elements to amplify the third reset and signal voltages using the first gain to provide a low gain third differential signal;
  a second high gain module coupled to the second plurality of storage elements to amplify the third reset and signal voltages using the second gain to provide a high gain third differential signal;
  a second multiplexer to provide a qualifying third signal, wherein the qualifying third signal is the low gain third differential signal if the high gain third differential signal is greater than the reference threshold, and wherein the qualifying third signal is the high gain third differential signal if the high gain third differential signal is less than the reference threshold; and
  a third multiplexer to provide the output signal for the pixel, wherein the output signal is the qualifying intermediate signal if the difference between the third reset and signal voltages corresponds to the saturation condition, and wherein the output signal is the qualifying third signal if the difference between the third reset and signal voltages does not correspond to the saturation condition.

36. The imager of claim 34, wherein the third integration time is greater than a time necessary to read out all rows of the pixel array.

* * * * *